United States Patent
Kaasila et al.

(10) Patent No.: US 11,657,602 B2
(45) Date of Patent: May 23, 2023

(54) FONT IDENTIFICATION FROM IMAGERY

(71) Applicant: Monotype Imaging Inc., Woburn, MA (US)

(72) Inventors: Sampo Juhani Kaasila, Portsmouth, NH (US); Jitendra Kumar Bansal, Rajasthan (IN); Anand Vijay, Bhopal (IN); Vishal Natani, Jaipur (IN); Chiranjeev Ghai, New Delhi (IN); Mayur G. Warialani, Gujarat (IN); Prince Dhiman, Chandigarh (IN)

(73) Assignee: Monotype Imaging Inc., Woburn, MA (US)

(*) Notice: Subject to any disclaimer, the term of this patent is extended or adjusted under 35 U.S.C. 154(b) by 0 days.

(21) Appl. No.: 16/175,401

(22) Filed: Oct. 30, 2018

(65) Prior Publication Data

US 2019/0130232 A1 May 2, 2019

Related U.S. Application Data

(60) Provisional application No. 62/578,939, filed on Oct. 30, 2017.

(51) Int. Cl.
*G06K 9/68* (2006.01)
*G06V 10/82* (2022.01)
(Continued)

(52) U.S. Cl.
CPC ............ *G06V 10/82* (2022.01); *G06F 40/109* (2020.01); *G06N 20/00* (2019.01); *G06V 20/62* (2022.01);
(Continued)

(58) Field of Classification Search
CPC .. G06K 9/6828; G06K 9/325; G06K 9/00456; G06K 9/6271; G06F 40/109;
(Continued)

(56) References Cited

U.S. PATENT DOCUMENTS

| 4,244,657 A | 1/1981 | Wasylyk |
| 4,998,210 A | 3/1991 | Kadono et al. |

(Continued)

FOREIGN PATENT DOCUMENTS

| EP | 0949574 | 10/1999 |
| EP | 2166488 A2 | 3/2010 |

(Continued)

OTHER PUBLICATIONS

Chen et al., "Detecting and reading text in natural scenes," Proceedings of the 2004 IEEE Computer Society Conference Vision and Pattern Recognition; Publication [online]. 2004 [retrieved Dec. 16, 2018]. Retrieved from the Internet: <URL:http://citeseerx.ist.psu.edu/viewdoc/download?doi=10.1.1.334.2715&rep=rep1&type=pdf>; pp. 1-8.

(Continued)

*Primary Examiner* — Chuong A Ngo
(74) *Attorney, Agent, or Firm* — Fish & Richardson P.C.

(57) ABSTRACT

A system includes a computing device that includes a memory configured to store instructions. The system also includes a processor to execute the instructions to perform operations that include receiving an image that includes textual content in at least one font. Operations also include identifying the at least one font represented in the received image using a machine learning system. The machine learning system being trained using images representing a plurality of training fonts. A portion of the training images includes text located in the foreground and being positioned over captured background imagery.

60 Claims, 7 Drawing Sheets

(51) Int. Cl.
*G06N 20/00* (2019.01)
*G06F 40/109* (2020.01)
*G06V 30/244* (2022.01)
*G06V 20/62* (2022.01)
*G06V 30/413* (2022.01)
*G06V 30/19* (2022.01)

(52) U.S. Cl.
CPC ...... *G06V 30/19173* (2022.01); *G06V 30/245* (2022.01); *G06V 30/413* (2022.01)

(58) Field of Classification Search
CPC ........ G06N 20/00; G06N 20/20; G06N 20/10; G06N 5/003; G06N 3/0472; G06N 3/0454; G06N 3/084
See application file for complete search history.

(56) References Cited

U.S. PATENT DOCUMENTS

| | | |
|---|---|---|
| 5,263,132 A | 11/1993 | Parker et al. |
| 5,347,266 A | 9/1994 | Bauman et al. |
| 5,412,771 A | 5/1995 | Fenwick |
| 5,416,898 A | 5/1995 | Opstad et al. |
| 5,444,829 A | 8/1995 | Kawabata et al. |
| 5,453,938 A | 9/1995 | Gohara et al. |
| 5,526,477 A | 6/1996 | McConnell et al. |
| 5,528,742 A | 6/1996 | Moore et al. |
| 5,533,174 A | 7/1996 | Flowers et al. |
| 5,586,242 A | 12/1996 | McQueen et al. |
| 5,606,649 A | 2/1997 | Tai |
| 5,619,721 A | 4/1997 | Maruko |
| 5,630,028 A | 5/1997 | DeMeo |
| 5,737,599 A | 4/1998 | Rowe et al. |
| 5,748,975 A | 5/1998 | Van De Vanter |
| 5,757,384 A | 5/1998 | Ikeda |
| 5,761,395 A | 6/1998 | Miyazaki et al. |
| 5,781,714 A | 7/1998 | Collins et al. |
| 5,877,776 A | 3/1999 | Beaman et al. |
| 5,926,189 A | 7/1999 | Beaman et al. |
| 5,940,581 A | 8/1999 | Lipton |
| 5,995,718 A | 11/1999 | Hiraike |
| 6,012,071 A | 1/2000 | Krishna et al. |
| 6,016,142 A | 1/2000 | Chang |
| 6,031,549 A | 2/2000 | Hayes-Roth |
| 6,044,205 A | 3/2000 | Reed et al. |
| 6,065,008 A | 5/2000 | Simon et al. |
| 6,073,147 A | 6/2000 | Chan et al. |
| 6,111,654 A | 8/2000 | Cartier |
| 6,141,002 A | 10/2000 | Kanungo et al. |
| 6,167,441 A | 12/2000 | Himmel |
| 6,249,908 B1 | 6/2001 | Stamm |
| 6,252,671 B1 | 6/2001 | Peng et al. |
| 6,282,327 B1 | 8/2001 | Betrisey |
| 6,313,920 B1 | 11/2001 | Dresevic et al. |
| 6,320,587 B1 | 11/2001 | Funyu |
| 6,323,864 B1 | 11/2001 | Kaul et al. |
| 6,330,577 B1 | 12/2001 | Kim |
| 6,343,301 B1 | 1/2002 | Halt et al. |
| 6,426,751 B1 | 7/2002 | Patel |
| 6,490,051 B1 | 12/2002 | Nguyen et al. |
| 6,512,531 B1 | 1/2003 | Gartland |
| 6,522,330 B2 | 2/2003 | Kobayashi |
| 6,522,347 B1 | 2/2003 | Tsuji |
| 6,583,789 B1 | 6/2003 | Carlson et al. |
| 6,601,009 B2 | 7/2003 | Florschuetz |
| 6,657,625 B1 | 12/2003 | Chik et al. |
| 6,675,358 B1 | 1/2004 | Kido |
| 6,678,688 B1 | 1/2004 | Unruh |
| 6,687,879 B1 | 2/2004 | Teshima |
| 6,704,116 B1 | 3/2004 | Abulhab |
| 6,704,648 B1 | 3/2004 | Naik et al. |
| 6,718,519 B1 | 4/2004 | Taieb |
| 6,738,526 B1 | 5/2004 | Betrisey |
| 6,754,875 B1 | 6/2004 | Paradies |
| 6,760,029 B1 | 7/2004 | Phinney et al. |
| 6,771,267 B1 | 8/2004 | Muller |
| 6,810,504 B2 | 10/2004 | Cooper et al. |
| 6,813,747 B1 | 11/2004 | Taieb |
| 6,853,980 B1 | 2/2005 | Ying et al. |
| 6,856,317 B2 | 2/2005 | Konsella et al. |
| 6,882,344 B1 | 4/2005 | Hayes et al. |
| 6,901,427 B2 | 5/2005 | Teshima |
| 6,907,444 B2 | 6/2005 | Narasimhan et al. |
| 6,952,210 B1 | 10/2005 | Renner et al. |
| 6,992,671 B1 | 1/2006 | Corona |
| 6,993,538 B2 | 1/2006 | Gray |
| 7,050,079 B1 | 5/2006 | Estrada et al. |
| 7,064,757 B1 | 6/2006 | Opstad et al. |
| 7,064,758 B2 | 6/2006 | Chik et al. |
| 7,155,672 B1 | 12/2006 | Adler et al. |
| 7,184,046 B1 | 2/2007 | Hawkins |
| 7,188,313 B2 | 3/2007 | Hughes et al. |
| 7,228,501 B2 | 6/2007 | Brown et al. |
| 7,231,602 B1 | 6/2007 | Truelove et al. |
| 7,346,845 B2 | 3/2008 | Teshima et al. |
| 7,373,140 B1 | 5/2008 | Matsumoto |
| 7,477,988 B2 | 1/2009 | Dorum |
| 7,492,365 B2 | 2/2009 | Corbin et al. |
| 7,505,040 B2 | 3/2009 | Stamm et al. |
| 7,539,939 B1 | 5/2009 | Schomer |
| 7,552,008 B2 | 6/2009 | Newstrom et al. |
| 7,580,038 B2 | 8/2009 | Chik et al. |
| 7,583,397 B2 | 9/2009 | Smith |
| 7,636,885 B2 | 12/2009 | Merz et al. |
| 7,701,458 B2 | 4/2010 | Sahuc et al. |
| 7,735,020 B2 | 6/2010 | Chaudhri |
| 7,752,222 B1 | 7/2010 | Cierniak |
| 7,768,513 B2 | 8/2010 | Klassen |
| 7,836,094 B2 | 11/2010 | Ornstein et al. |
| 7,882,432 B2 | 2/2011 | Nishikawa et al. |
| 7,937,658 B1 | 5/2011 | Lunde |
| 7,944,447 B2 | 5/2011 | Clegg et al. |
| 7,958,448 B2 | 6/2011 | Fattic et al. |
| 7,987,244 B1 | 7/2011 | Lewis et al. |
| 8,098,250 B2 | 1/2012 | Clegg et al. |
| 8,116,791 B2 | 2/2012 | Agiv |
| 8,201,088 B2 | 6/2012 | Levantovsky et al. |
| 8,201,093 B2 | 6/2012 | Tuli |
| 8,306,356 B1 | 11/2012 | Bever |
| 8,381,115 B2 | 2/2013 | Tranchant et al. |
| 8,413,051 B2 | 4/2013 | Bacus et al. |
| 8,464,318 B1 | 6/2013 | Hallak |
| 8,601,374 B2 | 12/2013 | Parham |
| 8,643,542 B2 | 2/2014 | Wendel |
| 8,643,652 B2 | 2/2014 | Kaplan |
| 8,644,810 B1 | 2/2014 | Boyle |
| 8,689,101 B2 | 4/2014 | Fux et al. |
| 8,707,208 B2 | 4/2014 | DiCamillo |
| 8,731,905 B1 | 5/2014 | Tsang |
| 9,063,682 B1 | 6/2015 | Bradshaw |
| 9,317,777 B2 | 4/2016 | Kaasila et al. |
| 9,319,444 B2 | 4/2016 | Levantovsky |
| 9,432,671 B2 | 8/2016 | Campanelli et al. |
| 9,449,126 B1 | 9/2016 | Genoni |
| 9,483,445 B1 | 11/2016 | Joshi et al. |
| 9,569,865 B2 | 2/2017 | Kaasila et al. |
| 9,576,196 B1 | 2/2017 | Natarajan |
| 9,626,337 B2 | 4/2017 | Kaasila et al. |
| 9,691,169 B2 | 6/2017 | Kaasila et al. |
| 9,805,288 B2 | 10/2017 | Kaasila et al. |
| 9,817,615 B2 | 11/2017 | Seguin et al. |
| 10,007,863 B1 | 6/2018 | Pereira et al. |
| 10,032,072 B1 * | 7/2018 | Tran .................. G06F 18/28 |
| 10,115,215 B2 | 10/2018 | Matteson et al. |
| 10,140,261 B2 | 11/2018 | Yang |
| 10,157,332 B1 | 12/2018 | Gray |
| 10,733,529 B1 | 8/2020 | Tran et al. |
| 10,867,241 B1 | 12/2020 | Rogers et al. |
| 11,334,750 B2 | 5/2022 | Arilla et al. |
| 11,537,262 B1 | 12/2022 | Kaasila et al. |
| 11,587,342 B2 | 2/2023 | Arilla et al. |
| 2001/0021937 A1 | 9/2001 | Cicchitelli et al. |
| 2001/0052901 A1 | 12/2001 | Kawabata et al. |

(56) References Cited

U.S. PATENT DOCUMENTS

| | | |
|---|---|---|
| 2002/0010725 A1 | 1/2002 | Mo |
| 2002/0029232 A1 | 3/2002 | Bobrow et al. |
| 2002/0033824 A1 | 3/2002 | Stamm |
| 2002/0052916 A1 | 5/2002 | Kloba et al. |
| 2002/0057853 A1 | 5/2002 | Usami |
| 2002/0059344 A1 | 5/2002 | Britton et al. |
| 2002/0087702 A1 | 7/2002 | Mori |
| 2002/0093506 A1 | 7/2002 | Hobson |
| 2002/0120721 A1 | 8/2002 | Eilers et al. |
| 2002/0122594 A1 | 9/2002 | Goldberg et al. |
| 2002/0174186 A1 | 11/2002 | Hashimoto et al. |
| 2002/0194261 A1 | 12/2002 | Teshima |
| 2003/0014545 A1 | 1/2003 | Broussard et al. |
| 2003/0076350 A1 | 4/2003 | Vu |
| 2003/0197698 A1 | 10/2003 | Perry et al. |
| 2004/0025118 A1 | 2/2004 | Renner |
| 2004/0088657 A1 | 5/2004 | Brown et al. |
| 2004/0119714 A1 | 6/2004 | Everett et al. |
| 2004/0177056 A1 | 9/2004 | Davis et al. |
| 2004/0189643 A1 | 9/2004 | Frisken et al. |
| 2004/0207627 A1 | 10/2004 | Konsella et al. |
| 2004/0233198 A1 | 11/2004 | Kubo |
| 2005/0015307 A1 | 1/2005 | Simpson et al. |
| 2005/0033814 A1 | 2/2005 | Ota |
| 2005/0094173 A1 | 5/2005 | Engelman et al. |
| 2005/0111045 A1 | 5/2005 | Imai |
| 2005/0128508 A1 | 6/2005 | Greef et al. |
| 2005/0149942 A1 | 7/2005 | Venkatraman |
| 2005/0190186 A1 | 9/2005 | Klassen |
| 2005/0193336 A1 | 9/2005 | Fux et al. |
| 2005/0200871 A1 | 9/2005 | Miyata |
| 2005/0264570 A1 | 12/2005 | Stamm |
| 2005/0270553 A1 | 12/2005 | Kawara |
| 2005/0275656 A1 | 12/2005 | Corbin et al. |
| 2006/0010371 A1 | 1/2006 | Shur et al. |
| 2006/0017731 A1 | 1/2006 | Matskewich et al. |
| 2006/0061790 A1 | 3/2006 | Miura |
| 2006/0072136 A1 | 4/2006 | Hodder et al. |
| 2006/0072137 A1 | 4/2006 | Nishikawa et al. |
| 2006/0072162 A1 | 4/2006 | Nakamura |
| 2006/0103653 A1 | 5/2006 | Chik et al. |
| 2006/0103654 A1 | 5/2006 | Chik et al. |
| 2006/0168639 A1 | 7/2006 | Gan |
| 2006/0241861 A1 | 10/2006 | Takashima |
| 2006/0245727 A1 | 11/2006 | Nakano et al. |
| 2006/0253395 A1 | 11/2006 | Corbell |
| 2006/0267986 A1 | 11/2006 | Bae et al. |
| 2006/0269137 A1 | 11/2006 | Evans |
| 2006/0285138 A1 | 12/2006 | Merz et al. |
| 2007/0002016 A1 | 1/2007 | Cho et al. |
| 2007/0006076 A1 | 1/2007 | Cheng |
| 2007/0008309 A1 | 1/2007 | Sahuc et al. |
| 2007/0024626 A1 | 2/2007 | Kagle et al. |
| 2007/0050419 A1 | 3/2007 | Weyl et al. |
| 2007/0055931 A1 | 3/2007 | Zaima |
| 2007/0139412 A1 | 6/2007 | Stamm |
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1 | 9/2007 | Engleman et al. |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0115046 A1 | 5/2008 | Yamaguchi |
| 2008/0118151 A1 | 5/2008 | Bouguet et al. |
| 2008/0154911 A1 | 6/2008 | Cheng |
| 2008/0222734 A1 | 9/2008 | Redlich et al. |
| 2008/0243837 A1 | 10/2008 | Davis |
| 2008/0282186 A1 | 11/2008 | Basavaraju |
| 2008/0303822 A1 | 12/2008 | Taylor |
| 2008/0306916 A1 | 12/2008 | Gonzalez et al. |
| 2009/0031220 A1 | 1/2009 | Tranchant |
| 2009/0037492 A1 | 2/2009 | Baitalmal et al. |
| 2009/0037523 A1 | 2/2009 | Kolke et al. |
| 2009/0063964 A1 | 3/2009 | Huang |
| 2009/0070128 A1 | 3/2009 | McCauley et al. |
| 2009/0097049 A1 | 4/2009 | Cho |
| 2009/0100074 A1 | 4/2009 | Joung et al. |
| 2009/0119678 A1 | 5/2009 | Shih |
| 2009/0158134 A1 | 6/2009 | Wang |
| 2009/0171766 A1 | 7/2009 | Schiff et al. |
| 2009/0183069 A1 | 7/2009 | Duggan et al. |
| 2009/0275351 A1 | 11/2009 | Jeung et al. |
| 2009/0287998 A1 | 11/2009 | Kalra |
| 2009/0290813 A1 | 11/2009 | He |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0066763 A1 | 3/2010 | MacDougall |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1 | 10/2010 | DiCamillo |
| 2010/0321393 A1 | 12/2010 | Levantovsky |
| 2011/0029103 A1 | 2/2011 | Mann et al. |
| 2011/0032074 A1 | 2/2011 | Novack et al. |
| 2011/0090229 A1 | 4/2011 | Bacus et al. |
| 2011/0090230 A1 | 4/2011 | Bacus et al. |
| 2011/0093565 A1 | 4/2011 | Bacus et al. |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0203000 A1 | 8/2011 | Bacus et al. |
| 2011/0238495 A1 | 9/2011 | Kang |
| 2011/0258535 A1 | 10/2011 | Adler, III et al. |
| 2011/0271180 A1 | 11/2011 | Lee |
| 2011/0276872 A1 | 11/2011 | Kataria |
| 2011/0289407 A1 | 11/2011 | Naik |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1 | 2/2012 | Perronnin et al. |
| 2012/0066590 A1 | 3/2012 | Harris et al. |
| 2012/0072978 A1 | 3/2012 | DeLuca et al. |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0134590 A1 | 5/2012 | Petrou |
| 2012/0215640 A1 | 8/2012 | Ramer et al. |
| 2012/0269425 A1 | 10/2012 | Marchesotti |
| 2012/0269441 A1 | 10/2012 | Marchesotti et al. |
| 2012/0288190 A1 | 11/2012 | Tang |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1 | 2/2013 | Linnerud et al. |
| 2013/0067319 A1 | 3/2013 | Olszewski et al. |
| 2013/0120396 A1 | 5/2013 | Kaplan |
| 2013/0127872 A1 | 5/2013 | Kaplan |
| 2013/0156302 A1 | 6/2013 | Rodriguez Serrano et al. |
| 2013/0163027 A1 | 6/2013 | Shustef |
| 2013/0179761 A1 | 7/2013 | Cho |
| 2013/0185028 A1 | 7/2013 | Sullivan |
| 2013/0215126 A1 | 8/2013 | Roberts |
| 2013/0215133 A1 | 8/2013 | Gould et al. |
| 2013/0321617 A1 | 12/2013 | Lehmann |
| 2013/0326348 A1 | 12/2013 | Ip et al. |
| 2014/0025756 A1 | 1/2014 | Kamens |
| 2014/0047329 A1 | 2/2014 | Levantovsky et al. |
| 2014/0052801 A1 | 2/2014 | Zuo et al. |
| 2014/0059054 A1 | 2/2014 | Liu et al. |
| 2014/0089348 A1 | 3/2014 | Vollmert |
| 2014/0136957 A1 | 5/2014 | Kaasila et al. |
| 2014/0153012 A1 | 6/2014 | Seguin |
| 2014/0176563 A1 | 6/2014 | Kaasila et al. |
| 2014/0195903 A1 | 7/2014 | Kaasila et al. |
| 2014/0279039 A1 | 9/2014 | Systrom et al. |
| 2014/0282055 A1 | 9/2014 | Engel et al. |

(56) References Cited

U.S. PATENT DOCUMENTS

| | | |
|---|---|---|
| 2014/0358802 A1 | 12/2014 | Biswas |
| 2015/0020212 A1 | 1/2015 | Demaree |
| 2015/0030238 A1 | 1/2015 | Yang et al. |
| 2015/0036919 A1 | 2/2015 | Bourdev et al. |
| 2015/0055855 A1 | 2/2015 | Rodriguez et al. |
| 2015/0062140 A1 | 3/2015 | Levantovsky et al. |
| 2015/0074522 A1 | 3/2015 | Harned, III et al. |
| 2015/0097842 A1 | 4/2015 | Kaasila et al. |
| 2015/0100882 A1 | 4/2015 | Severenuk |
| 2015/0146020 A1* | 5/2015 | Imaizumi ............ H04N 19/167 348/222.1 |
| 2015/0154002 A1 | 6/2015 | Weinstein et al. |
| 2015/0178476 A1 | 6/2015 | Horton |
| 2015/0193386 A1 | 7/2015 | Wurtz |
| 2015/0220494 A1 | 8/2015 | Qin et al. |
| 2015/0278167 A1 | 10/2015 | Arnold et al. |
| 2015/0339273 A1 | 11/2015 | Yang et al. |
| 2015/0339276 A1 | 11/2015 | Bloem et al. |
| 2015/0339543 A1 | 11/2015 | Campanelli et al. |
| 2015/0348297 A1 | 12/2015 | Kaasila et al. |
| 2016/0078656 A1 | 3/2016 | Borson et al. |
| 2016/0092439 A1 | 3/2016 | Ichimi |
| 2016/0140952 A1 | 5/2016 | Graham |
| 2016/0170940 A1 | 6/2016 | Levantovsky |
| 2016/0171343 A1 | 6/2016 | Kaasila et al. |
| 2016/0182606 A1 | 6/2016 | Kaasila et al. |
| 2016/0246762 A1 | 8/2016 | Eaton |
| 2016/0307156 A1 | 10/2016 | Burner |
| 2016/0307347 A1 | 10/2016 | Matteson et al. |
| 2016/0314377 A1 | 10/2016 | Vieira et al. |
| 2016/0321217 A1 | 11/2016 | Ikemoto et al. |
| 2016/0344282 A1 | 11/2016 | Hausler |
| 2016/0344828 A1 | 11/2016 | Hausler |
| 2016/0350336 A1 | 12/2016 | Checka |
| 2016/0371232 A1 | 12/2016 | Ellis et al. |
| 2017/0011279 A1* | 1/2017 | Soldevila ............ G06V 30/194 |
| 2017/0017778 A1 | 1/2017 | Ford et al. |
| 2017/0024641 A1 | 1/2017 | Wierzynski |
| 2017/0039445 A1 | 2/2017 | Tredoux et al. |
| 2017/0098138 A1* | 4/2017 | Wang ............... G06F 18/24137 |
| 2017/0098140 A1 | 4/2017 | Wang et al. |
| 2017/0124503 A1 | 5/2017 | Bastide |
| 2017/0237723 A1 | 8/2017 | Gupta et al. |
| 2017/0357877 A1 | 12/2017 | Lin |
| 2018/0039605 A1 | 2/2018 | Pao et al. |
| 2018/0075455 A1 | 3/2018 | Kumnick et al. |
| 2018/0082156 A1 | 3/2018 | Jin et al. |
| 2018/0097763 A1 | 4/2018 | Garcia et al. |
| 2018/0109368 A1 | 4/2018 | Johnson et al. |
| 2018/0144256 A1 | 5/2018 | Saxena et al. |
| 2018/0165554 A1 | 6/2018 | Zhang |
| 2018/0203851 A1 | 7/2018 | Wu et al. |
| 2018/0253988 A1 | 9/2018 | Kanayama et al. |
| 2018/0285696 A1 | 10/2018 | Eigen et al. |
| 2018/0285965 A1 | 10/2018 | Kaasila et al. |
| 2018/0300592 A1* | 10/2018 | Jin ......................... G06N 3/045 |
| 2018/0332140 A1 | 11/2018 | Bullock |
| 2018/0341907 A1 | 11/2018 | Tucker et al. |
| 2018/0349527 A1* | 12/2018 | Li ............................ B25J 9/161 |
| 2018/0373921 A1 | 12/2018 | Di Carlo |
| 2019/0019087 A1 | 1/2019 | Fukui |
| 2019/0073537 A1 | 3/2019 | Arilla et al. |
| 2019/0095763 A1 | 3/2019 | Arilla et al. |
| 2020/0219274 A1 | 7/2020 | Afridi et al. |

FOREIGN PATENT DOCUMENTS

| | | |
|---|---|---|
| EP | 2857983 | 4/2015 |
| JP | 06-258982 | 9/1994 |
| JP | H10-124030 | 5/1998 |
| JP | 2002-507289 | 3/2002 |
| JP | 2003-288184 | 10/2003 |
| JP | 05-215915 | 8/2005 |
| JP | 05-217816 | 8/2005 |
| JP | 2007-011733 | 1/2007 |
| JP | 2009-545064 | 12/2009 |
| JP | 5140997 | 11/2012 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 04/012099 | 2/2004 |
| WO | WO 05/001675 | 1/2005 |
| WO | WO 2008/013720 | 1/2008 |

OTHER PUBLICATIONS

International Search Report & Written Opinion in International Application No. PCT/US18/58191, dated Feb. 19, 2019, 17 pages.
Koren et al., "Visualization of labeled data using linear transformations." IEEE Symposium on Information Visualization, 2003 (IEEE Cat. No. 03TH8714).
Liu, "Visual Exploration and Comparative Analytics of Multidimensional Data Sets", Graduate Program in Computer Science and Engineering, The Ohio State University, 2016, 210 pages.
Shusen, et al. "Distortion-Guided Structure-Driven Interactive Exploration of High-Dimensional Data," Computer Graphics Forum., 2014, 33(3):101-110.
Wu et al., "Stochastic neighbor projection on manifold for feature extraction." Neurocomputing, 2011,74(17):780-2789.
"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.
"Announcing Speakeasy: A new open-source language tool from Typekit," Oct. 28, 2010, on-line http://blog.typekit.com/2010/10/28/announcing-speakeasy-a-new-open-source-language-tool-from-typekit/.
"colorfont/v1," Feb. 28, 2011, retrieved from the internet: http://manufacturaindependente.com/colorfont/v1/.
"Flash CS4 Professional ActionScript 2.0", 2007, retrieved on http://help.adobe.com/en_US/AS2LCR/Flash_10.0/help.html?content=00000284.html on Aug. 31, 2015.
"photofont.com—Use photofonts," Sep. 2, 2012, retrieved from the internet: http://web.archive.org/web/20120902021143/http://photofont.com/photofont/use/web.
"Saffron Type System", retrieved from the internet Nov. 12, 2014, 7 pages.
Adobe Systems Incorporated, "PostScript Language Reference—Third Edition," Feb. 1999, pp. 313-390.
Adobe Systems Incorporated, "The Type 42 Font Format Specification," Technical Note #5012, Jul. 31, 1998, pp. 1-24.
Adobe Systems Incorporated, "To Unicode Mapping File Tutorial," Adobe Technical Note, XP002348387, May 2003.
Apple Computers, "The True Type Font File," Oct. 27, 2000, pp. 1-17.
Celik et al., "W3C, CSS3 Module: Fonts," W3C Working Draft, Jul. 31, 2001, pp. 1-30.
Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.
European Search Report, 13179728.4, dated Sep. 10, 2015, 3 pages.
European Search Report, 14184499.3, dated Jul. 13, 2015, 7 pages.
European Search Report, 14187549.2, dated Jul. 30, 2015, 7 pages.
European Search Report in European Application No. 18193233.6, dated Nov. 11, 2018, 8 pages.
European Search Report in European Application No. 18197313.2, dated Nov. 30, 2018, 7 pages.
Extensis, Suitcase 10.2, Quick Start Guide for Macintosh, 2001, 23 pgs.
Font Pair, [online]. "Font Pair", Jan. 20, 2015, Retrieved from URL: http://web.archive.org/web/20150120231122/http://fontpair.co/, 31 pages.

(56) References Cited

OTHER PUBLICATIONS

Forums.macrumors.com' [online]. "which one is the main FONTS folder?" May 19, 2006, [retrieved on Jun. 19, 2017]. Retrieved from the Internet: URL<http://forums.macrumors.com/threads/which-one-is-the-main-fontsfolder.202284/>, 7 pages.

George Margulis, "Optical Character Recognition: Classification of Handwritten Digits and Computer Fonts", Aug. 1, 2014, URL: https://web.archive.org/web/20140801114017/http://cs229.stanford.edu/proj2011/Margulis-OpticalCharacterRecognition.pdf.

Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.

International Preliminary Report on Patentability issued in PCT application No. PCT/US2013/071519 dated Jun. 9, 2015, 8 pages.

International Preliminary Report on Patentability issued in PCT application No. PCT/US2015/066145 dated Jun. 20, 2017, 7 pages.

International Preliminary Report on Patentability issued in PCT application No. PCT/US2016/023282, dated Oct. 26, 2017, 9 pages.

International Search Report & Written Opinion issued in PCT application No. PCT/US10/01272, dated Jun. 15, 2010, 6 pages.

International Search Report & Written Opinion issued in PCT application No. PCT/US2011/034050 dated Jul. 15, 2011, 13 pages.

International Search Report & Written Opinion, PCT/US2013/026051, dated Jun. 5, 2013, 9 pages.

International Search Report & Written Opinion, PCT/US2013/071519, dated Mar. 5, 2014, 12 pages.

International Search Report & Written Opinion, PCT/US2013/076917, dated Jul. 9, 2014, 11 pages.

International Search Report & Written Opinion, PCT/US2014/010786, dated Sep. 30, 2014, 9 pages.

International Search Report & Written Opinion, PCT/US2016/023282, dated Oct. 7, 2016, 16 pages.

Japanese Office Action, 2009-521768, dated Aug. 28, 2012.

Japanese Office Action, 2013-508184, dated Apr. 1, 2015.

Ma Wei-Ying et al., "Framework for adaptive content delivery in heterogeneous network environments", Jan. 24, 2000, Retrieved from the Internet: http://www.cooltown.hp.com/papers/adcon/MMCN2000.

Open Text Exceed, User's Guide, Version 14, Nov. 2009, 372 pgs.

Saurabh, Kataria et al., "Font retrieval on a large scale: An experimental study", 2010 17*th* IEEE International Conference on Image Processing (ICIP 2010); Sep. 26-29, 2010; Hong Kong, China, IEEE, Piscataway, NJ, USA, Sep. 26, 2010, pp. 2177-2180.

Supplementary European Search Report, European Patent Office, European patent application No. EP 07796924, dated Dec. 27, 2010, 8 pages.

TrueType Fundamentals, Microsoft Typography, Nov. 1997, pp. 1-17.

Typeconnection, [online]. "typeconnection", Feb. 26, 2015, Retrieved from URL: http://web.archive.org/web/20150226074717/http://www.typeconnection.com/stepl.php, 4 pages.

Universal Type Server, Upgrading from Suitcase Server, Sep. 29, 2009, 18 pgs.

Wenzel, Martin, "An Introduction to OpenType Substitution Features," Dec. 26, 2012, Retrieved from the internet: http://web.archive.org/web/20121226233317/http://ilovetypography.com/OpenType/opentype-features. Html (retrieved on Sep. 18, 2014), 12 pages.

Written Opposition to the grant of Japanese Patent No. 6097214 by Masatake Fujii, dated Sep. 12, 2017, 97 pages, with partial English translation.

International Preliminary Report on Patentability in International Appln. No. PCT/US2018/058191, dated May 5, 2020, 10 pages.

Rannanathan et al. "A Novel Technique for English Font Recognition Using Support Vector Machines," 2009 International Conference on Advances in Recent Technologies in Communication and Computing, 2009, pp. 766-769.

Rannanathan et al., "Tamil Font Recognition Using Gabor Filters and Support Vector Machines," 2009 International Conference on Advances in Computing, Control and Telecommunication Technologies, 2009, pp. 613-615.

O'Donovan et al., "Exploratory Font Selection Using Crowdsourced Attributes," ACT TOG, Jul. 2014, 33(4): 9 pages.

Wikipedia.com [online], "Feature selection," Wikipedia, Sep. 19, 2017, retrieved on Oct. 19, 2021, retrieved from URL<https://en.wikipedia.org/w/index.php?title=Feature selection&oldid=801416585>, 15 pages.

www.dgp.toronto.edu [online], "Supplemental Material: Exploratory Font Selection Using Crowdsourced Attributes," available on or before May 12, 2014, via Internet Archive: Wayback Machine URL <https://web.archive.org/web/20140512101752/http://www.dgp.toronto.edu/~donovan/font/supplemental.pdf>, retrieved on Jun. 28, 2021, URL<http://www.dgp.toronto.edu/~donovan/font/supplemental.pdf>, 9 pages.

* cited by examiner

FONT IDENTIFICATION FROM IMAGERY

CROSS-REFERENCE TO RELATED APPLICATIONS

This application claims priority under 35 USC 119(e) to U.S. Provisional application No. 62/578,939, filed on Oct. 30, 2017. The entire disclosure of this application is incorporated by reference herein.

BACKGROUND

This description relates to identifying individual fonts present in images by using one or more techniques such as artificial intelligence.

Graphic designers along with other professionals are often interested in identifying fonts noticed in various media (e.g., appearing on signs, books, periodicals, etc.) for later use. Some may take a photo of the text represented in the font of interest and later attempt to manually identify the font, which can be an extremely laborious and tedious task. To identify the font, the individual may need to exhaustively explore a seemingly endless list of hundreds or even thousands of alphabetically ordered fonts.

SUMMARY

The described systems and techniques are capable of effectively identifying fonts in an automatic manner from an image (e.g., a photograph) by using artificial intelligence. By extensive training of a machine learning system, font identification can be achieved with a high probability of success. Along with using a relative large font sample set, training the machine learning system can include using different image types and augmented images (e.g., distorted images) of fonts so the system is capable of recognizing fonts presented in less than pristine imagery.

In one aspect, a computing device implemented method includes receiving an image that includes textual content in at least one font. The method also includes identifying the at least one font represented in the received image using a machine learning system. The machine learning system being trained using images representing a plurality of training fonts. A portion of the training images includes text located in the foreground and being positioned over captured background imagery.

Implementations may include one or more of the following features. The text located in the foreground may be synthetically augmented. Synthetic augmentation may be provided in a two-step process. The text may be synthetically augmented based upon one or more predefined conditions. The text located in the foreground may be undistorted. The text may be included in captured imagery. The captured background imagery may be predominately absent text. The text located in the foreground may be randomly positioned in the portion of training images. Prior to the text being located in the foreground, a portion of the text may be removed. The captured background imagery may be distorted when captured. Font similarity may be used to identify the at least one font. Similarity of fonts in multiple image segments may be used to identify the at least one font. The machine learning system may be trained by using transfer learning. An output of the machine learning system may represent each font used to train the machine learning system. The output of the machine learning system may provide a level of confidence for each font used to train the machine learning system. A subset of the output of the machine learning system may be scaled and a remainder of the output is removed. Some of the training images may be absent identification. Identifying the at least one font represented in the received image using the machine learning system may include using additional images received by the machine learning system. Outputs of the machine learning system for the received image and the additional images may be combined to identify the at least one font.

In another aspect, a system includes a computing device that includes a memory configured to store instructions. The system also includes a processor to execute the instructions to perform operations that include receiving an image that includes textual content in at least one font. Operations also include identifying the at least one font represented in the received image using a machine learning system. The machine learning system being trained using images representing a plurality of training fonts. A portion of the training images includes text located in the foreground and being positioned over captured background imagery.

Implementations may include one or more of the following features. The text located in the foreground may be synthetically augmented. Synthetic augmentation may be provided in a two-step process. The text may be synthetically augmented based upon one or more predefined conditions. The text located in the foreground may be undistorted. The text may be included in captured imagery. The captured background imagery may be predominately absent text. The text located in the foreground may be randomly positioned in the portion of training images. Prior to the text being located in the foreground, a portion of the text may be removed. The captured background imagery may be distorted when captured. Font similarity may be used to identify the at least one font. Similarity of fonts in multiple image segments may be used to identify the at least one font. The machine learning system may be trained by using transfer learning. An output of the machine learning system may represent each font used to train the machine learning system. The output of the machine learning system may provide a level of confidence for each font used to train the machine learning system. A subset of the output of the machine learning system may be scaled and a remainder of the output is removed. Some of the training images may be absent identification. Identifying the at least one font represented in the received image using the machine learning system may include using additional images received by the machine learning system. Outputs of the machine learning system for the received image and the additional images may be combined to identify the at least one font.

In another aspect, one or more computer readable media store instructions that are executable by a processing device, and upon such execution cause the processing device to perform operations including receiving an image that includes textual content in at least one font. Operations also include identifying the at least one font represented in the received image using a machine learning system. The machine learning system being trained using images representing a plurality of training fonts. A portion of the training images includes text located in the foreground and being positioned over captured background imagery.

Implementations may include one or more of the following features. The text located in the foreground may be synthetically augmented. Synthetic augmentation may be provided in a two-step process. The text may be synthetically augmented based upon one or more predefined conditions. The text located in the foreground may be undistorted. The text may be included in captured imagery. The captured background imagery may be predominately absent text. The text located in the foreground may be randomly positioned in the portion of training images. Prior to the text being located in the foreground, a portion of the text may be removed. The captured background imagery may be distorted when captured. Font similarity may be used to identify the at least one font. Similarity of fonts in multiple image segments may be used to identify the at least one font. The machine learning system may be trained by using transfer learning. An output of the machine learning system may represent each font used to train the machine learning system. The output of the machine learning system may provide a level of confidence for each font used to train the machine learning system. A subset of the output of the machine learning system may be scaled and a remainder of the output is removed. Some of the training images may be absent identification. Identifying the at least one font represented in the received image using the machine learning system may include using additional images received by the machine learning system. Outputs of the machine learning system for the received image and the additional images may be combined to identify the at least one font.

In another aspect, a computing device implemented method includes receiving an image that includes textual content in at least one font, and, identifying the at least one font represented in the received image using a machine learning system, the machine learning system being trained using images representing a plurality of training fonts, wherein a portion of the training images is produced by a generator neural network.

Implementations may include one or more of the following features. The generator neural network may provide augmented imagery to a discriminator neural network for preparing the generator neural network. The augmented imagery produced by the generator neural network may include a distorted version of a font to train the machine learning system. Determinations produced by the discriminator neural network may be used to improve operations of the discriminator neural network. Determinations produced by the discriminator neural network may be used to improve operations of the generator neural network. Font similarity may be used to identify the at least one font. Similarity of fonts in multiple image segments may be used to identify the at least one font. The machine learning system may be trained by using transfer learning. An output of the machine learning system may represent each font used to train the machine learning system. The output of the machine learning system may provide a level of confidence for each font used to train the machine learning system. A subset of the output of the machine learning system may be scaled and a remainder of the output is removed. Some of the training images may be absent identification. Identifying the at least one font represented in the received image using the machine learning system may include using additional images received by the machine learning system. Outputs of the machine learning system for the received image and the additional received images may be combined to identify the at least one font.

In another aspect, a system includes a computing device that includes a memory configured to store instructions. The system also includes a processor to execute the instructions to perform operations that include receiving an image that includes textual content in at least one font. Operations also include identifying the at least one font represented in the received image using a machine learning system, the machine learning system being trained using images representing a plurality of training fonts, wherein a portion of the training images is produced by a generator neural network.

Implementations may include one or more of the following features. The generator neural network may provide augmented imagery to a discriminator neural network for preparing the generator neural network. The augmented imagery produced by the generator neural network may include a distorted version of a font to train the machine learning system. Determinations produced by the discriminator neural network may be used to improve operations of the discriminator neural network. Determinations produced by the discriminator neural network may be used to improve operations of the generator neural network. Font similarity may be used to identify the at least one font. Similarity of fonts in multiple image segments may be used to identify the at least one font. The machine learning system may be trained by using transfer learning. An output of the machine learning system may represent each font used to train the machine learning system. The output of the machine learning system may provide a level of confidence for each font used to train the machine learning system. A subset of the output of the machine learning system may be scaled and a remainder of the output is removed. Some of the training images may be absent identification. Identifying the at least one font represented in the received image using the machine learning system may include using additional images received by the machine learning system. Outputs of the machine learning system for the received image and the additional received images may be combined to identify the at least one font.

In another aspect, one or more computer readable media store instructions that are executable by a processing device, and upon such execution cause the processing device to perform operations including receiving an image that includes textual content in at least one font. Operations also include identifying the at least one font represented in the received image using a machine learning system, the machine learning system being trained using images representing a plurality of training fonts, wherein a portion of the training images is produced by a generator neural network.

Implementations may include one or more of the following features. The generator neural network may provide augmented imagery to a discriminator neural network for preparing the generator neural network. The augmented imagery produced by the generator neural network may include a distorted version of a font to train the machine learning system. Determinations produced by the discriminator neural network may be used to improve operations of the discriminator neural network. Determinations produced by the discriminator neural network may be used to improve operations of the generator neural network. Font similarity may be used to identify the at least one font. Similarity of fonts in multiple image segments may be used to identify the at least one font. The machine learning system may be trained by using transfer learning. An output of the machine learning system may represent each font used to train the machine learning system. The output of the machine learning system may provide a level of confidence for each font used to train the machine learning system. A subset of the output of the machine learning system may be scaled and a remainder of the output is removed. Some of the training images may be absent identification. Identifying the at least one font represented in the received image using the machine learning system may include using additional images received by the machine learning system. Outputs of the machine learning system for the received image and the additional received images may be combined to identify the at least one font.

These and other aspects, features, and various combinations may be expressed as methods, apparatus, systems, means for performing functions, program products, etc.

Other features and advantages will be apparent from the description and the claims.

DETAILED DESCRIPTION

Figure 1:
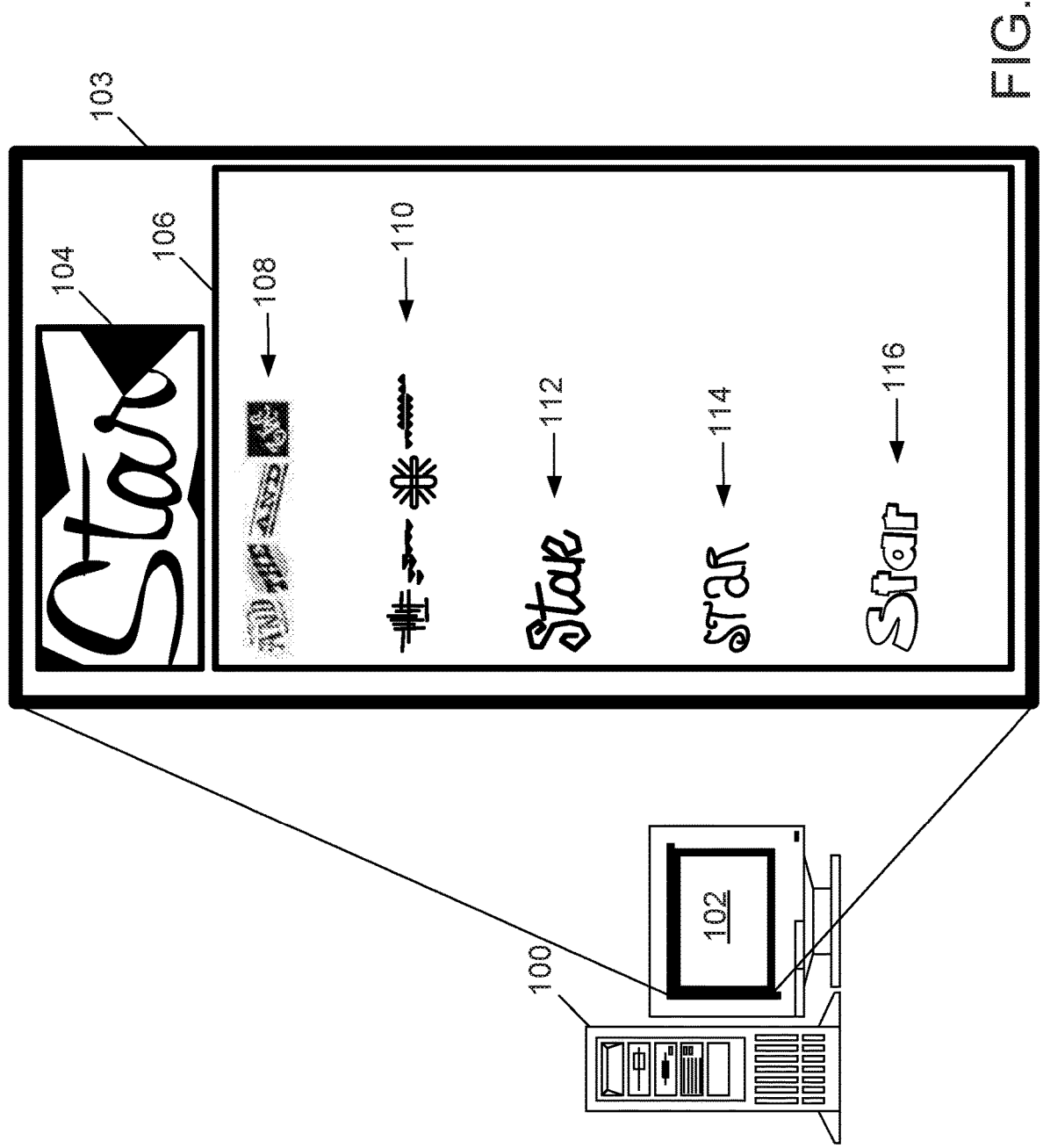
FIG. 1 illustrates a computer system attempting to identify a font.

Referring to FIG. 1, a computing device (e.g., a computer system 100) includes a display 102 that allows a user to view a list of fonts generated by the computing device. When operating with pristine imagery, predicting the font or fonts present in such images can be achieved using one or more convention techniques (e.g., searching font libraries, pattern matching, etc.). However, attempting to detect and identify one or more fonts from a less than pristine images (e.g., referred to as real world images) can result in a low probability of success. For example, an individual (e.g., graphic designer) may be interested in identifying a font present in a street sign and capture of picture of the sign in less than ideal environment conditions (e.g., low lighting, poor weather, etc.). As illustrated, the captured image may also include other content that can hinder operations to identify the font. In this example, via an interface 103, an image 104 containing text in a distinct font also includes other content that is separate from the text (e.g., the text is printed on a graphic of a star). Due to this additional content, operations of the computer system can have difficulty in separating the text (in the font of interest) from the background graphic. Based upon the combined contents of the image 104, a list of possible matching fonts 106 generated by the computer system 100 includes entries that are less than accurate matches. For example, the top prediction 108 is a font that contains different graphics as elements. Other predicted fonts 110, 112, 114, and 116 included in the list 106 similarly present fonts that are far from matching the font present in the image 104. Presented with such results, the individual interested in identifying the font captured in image 104 may need to manually search through hundreds if not thousands of fonts in multiple libraries. As such, tens of hours may be lost through the search or the individual may abandon the task and never identify this font of interest.

Figure 2:
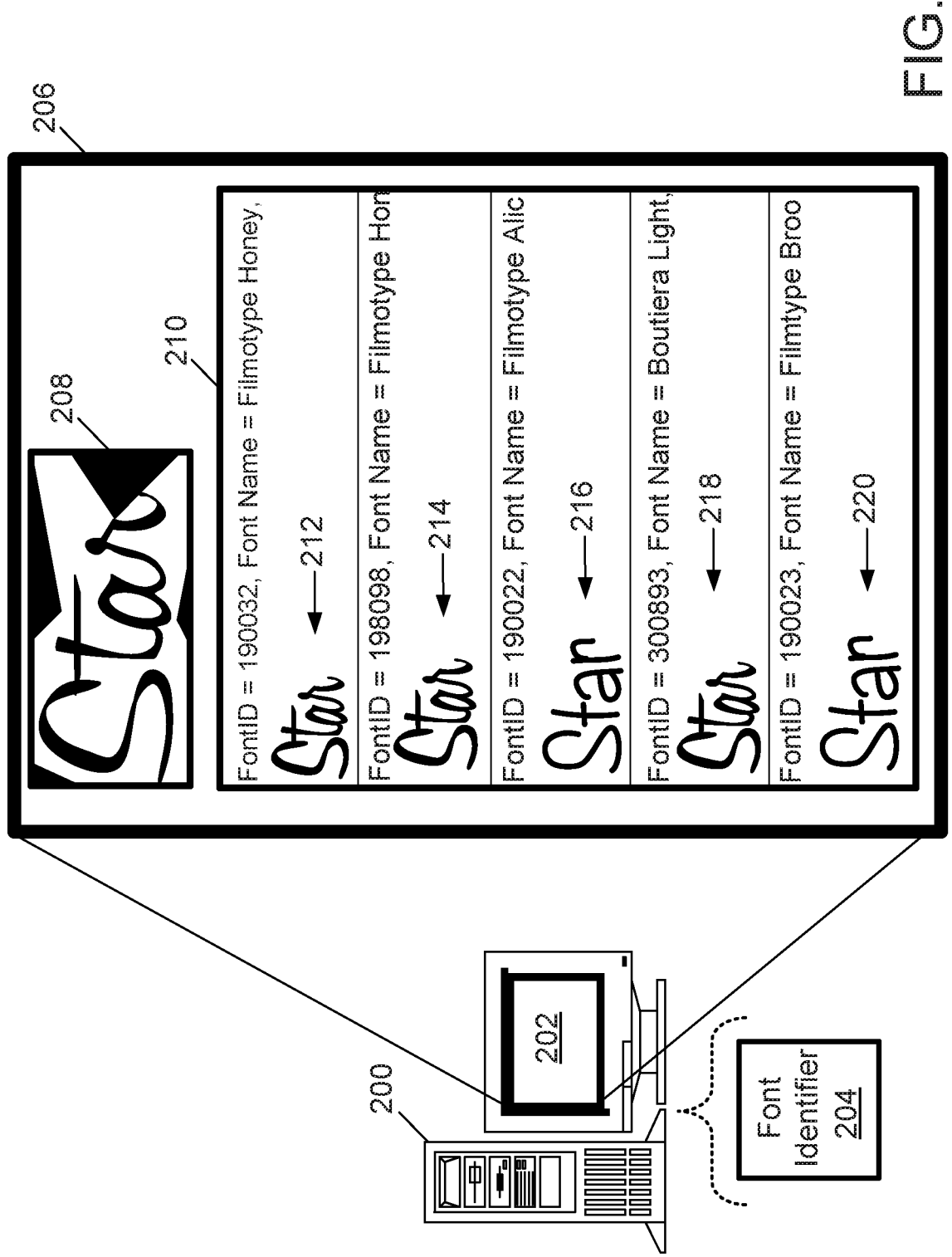
FIG. 2 illustrates a computer system presenting a listing for identifying a font.

Referring to FIG. 2, another computing device (e.g., a computer system 200) also includes a display 202 that allows a user to view imagery, for example, to identify one or more fonts of interest. Computer system 200 executes a font identifier 204 that employs artificial intelligence to identify one or more fonts present in images or other types of media. By using artificial intelligence, the font identifier 204 can detect and identify fonts present in images captured under less than optimum conditions. For example, the font identifier 204 can include a machine learning system that is trained with pristine images of fonts and many distorted representations of fonts. By using such training data sets, the font identifier 204 is capable of detecting fonts represented in many types of images. Using this capability, the font identifier 204 is able to identify a list of potentially matching fonts that have a higher level of confidence (compared to the system shown in FIG. 1). As illustrated in this example, an interface 206 presented on the display 202 includes an input image 208 (which is equivalent to the image 104 shown in FIG. 1). After analyzing the complex content of the image 208, the machine learning system of the font identifier 204 identifies and presents potentially matching candidates in an ordered list 210 that includes a font 212 with the highest level of confidence (for being a match) at the highest position of the list. The list 210 also includes other fonts 214-220 identified as possible matches but not having the same level of confidence as the font 212 in the upper most position on the list. Compared to the list of candidates presented in FIG. 1, the machine learning system employed by the font identifier 204 provides closer matches to the font present input image 208. As such, the individual attempting to identify the font is not only provided a near matching font (if not an exactly matching font) but also a number of closely matching fonts are identified from an image that contains content not related to the textual content of the image.

To provide this functionality, the font identifier 204 may use various machine learning techniques such as deep learning to improve the identification processes through training the system (e.g., expose multilayer neural networks to training data, feedback, etc.). Through such machine learning techniques, the font identifier 204 uses artificial intelligence to automatically learn and improve from experience without being explicitly programmed. Once trained (e.g., from images of identified fonts, distorted images of identified fonts, images if unidentified fonts, etc.), one or more images, representation of images, etc. can be input into the font identifier 204 to yield an output. Further, by returning information about the output (e.g., feedback), the machine learning technique can use the output as additional training information. Other training data can also be provided for further training. By using increased amounts of training data (e.g., images of identified fonts, unidentified fonts, etc.), feedback data (e.g., data representing user confirmation of identified fonts), etc. the accuracy of the system can be improved (e.g., to predict matching fonts).

Other forms of artificial intelligence techniques may be used by the font identifier 204. For example, to process information (e.g., images, image representations, etc.) to identify fonts, etc., the architecture may employ decision tree learning that uses one or more decision trees (as a predictive model) to progress from observations about an item (represented in the branches) to conclusions about the item's target (represented in the leaves). In some arrangements, random forests or random decision forests are used and can be considered as an ensemble learning method for classification, regression and other tasks. Such techniques generally operate by constructing a multitude of decision trees at training time and outputting the class that is the mode of the classes (classification) or mean prediction (regression) of the individual trees. Support vector machines (SVMs) can be used that are supervised learning models with associated learning algorithms that analyze data used for classification and regression analysis.

Ensemble learning systems may also be used for font prediction in which multiple system members independently arrive at a result. System members can be of the same type (e.g., each is a decision tree learning machine, etc.) or members can be of different types (e.g., one Deep CNN system such as a ResNet50, one SVM system, one decision tree system, etc.). Upon each system member determining a result, a majority vote among the system members is used (or other type of voting technique) to determine an overall prediction result. In some arrangements, one or more knowledge-based systems such as an expert systems may be employed. In general, such expert systems are designed by solving relatively complex problems by using reasoning techniques that may employ conditional statements (e.g., if-then rules). In some arrangements such expert systems may use multiple systems such as a two sub-system design, in which one system component stores structured and/or unstructured information (e.g., a knowledge base) and a second system component applies rules, etc. to the stored information (e.g., an inference engine) to determine results of interest (e.g., select images likely to be presented).

Figure 3:
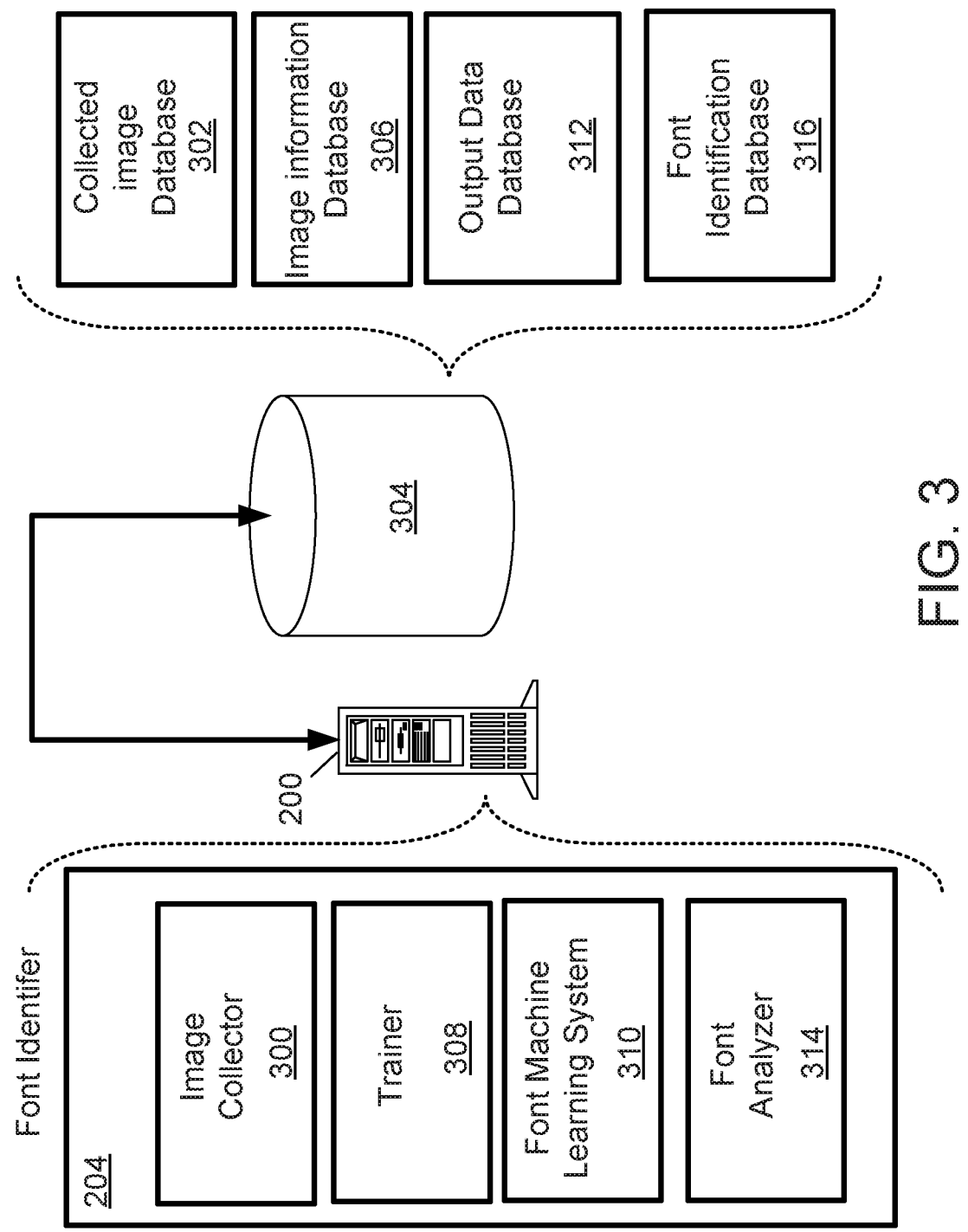
FIG. 3 is a block diagram of the font identifier shown in FIG. 2.

Referring to FIG. 3, the font identifier 204 (which is executed by the computer system 200, e.g., a server, etc.), is illustrated as containing a number of modules. In this arrangement, the font identifier 204 includes an image collector 300 that is capable of receiving data that represents a variety of images. For example, images can be provided in one or more formats (e.g., .jpeg, .pdf, etc.) that provide a visual element representation (e.g., a pixel representation) of a corresponding image. In some cases, additional information can be provided with the imagery; for example, one or more attributes that reflect aspects of an image. For example, data may be included that identifies any font or fonts represented in the image. For instances where one or more fonts are identified, the image can be considered as being labeled. Attributes can also be provided that represent visual aspects of imagery (e.g., resolution, identify region where text is located—location of the rectangle that contains the text, color(s) of the text, color(s) of the image's background, etc.), content aspects (e.g., information about the text such as the font category being used by the text—what type of san serif font is being used by the text), etc. Such attributes can be represented in various forms; for example, each attribute may be represented by one or more numerical values (e.g., Boolean values, fix point values, floating point values, etc.) and all of the attributes may be provided in single form (e.g., a vector of numerical values) to the font identifier 204.

In this arrangement, such image data may be collected by an image collector 300 and stored (e.g., in a collected image database 302) on a storage device 304 for later retrieval. In some arrangements, information associated with images (e.g., font information, image attributes, etc.) may be provided and stored in an image information database 306. Retrieving the image data (stored in database 302) and/or image information (stored in the database 306), a trainer 308 is provided the data to train a font machine learning system 310. Various type of data may be used for training the system; for example, images (e.g., thousands of images, millions of images) can be used by the trainer 308. For example, pristine images of fonts (e.g., portions of font characters, font characters, phrases using a font), distorted images of fonts (e.g., synthetically altered versions of fonts), real-world images of fonts (e.g., images captured by individuals in real-world conditions that include one or more fonts) may be used to train the font machine learning system 310. For some images of fonts (e.g., images of pristine fonts, synthetically altered versions of fonts, etc.) information that identifies each included font (e.g., labels) may be provided for training. Alternatively, for some images (e.g., captured under real-world conditions), identifying information (of included fonts) may be absent.

Once trained, the font machine learning system 310 may be provided input data such as one or more images to identify the font or fonts present in the images. For example, after being trained using pristine, distorted, and real-world images of fonts, images containing unidentified fonts and captured under real-world conditions may be input for predicting the contained fonts (as illustrated in FIG. 2). The font identifier 204 may output data that represents the predicted font or fonts determined through an analysis of the input image. For example, a vector may be output in which each vector element represents one potentially matching font. In one arrangement, this vector may include a considerable number of elements (e.g., 133,000 elements), one for each font used to train the system. Various types of data may be provided by each element to reflect how well the font representing that particular element matches the font present in the input. For example, each element of the vector may include a floating-point number that represents a level of confidence that the corresponding font (represented by the vector element) matches a font included in the input. In some arrangements, the sum of these vector quantities represent a predefined amount (e.g., a value of one) to assist comparing confidence levels and determining which fonts are closer matches. In this example, the output vector (e.g., 133,000 element vector) from the font learning machine system 310 is stored in an output data database 312. A font analyzer 314 can retrieve the data from the database 312 and determine which font or fonts is the closest match to the input (e.g., by reviewing the level of confidence in the stored vector elements). The results determined by the font analyzer 314 (e.g., an ordered list of fonts) can be stored on the storage device 304 (e.g., in a font identification database 316) for later retrieval and use. For example, the input images (captured under real-world conditions) and correspondingly identified fonts be further used to train the font machine learning system 310 or other artificial intelligence based systems.

Figure 4:
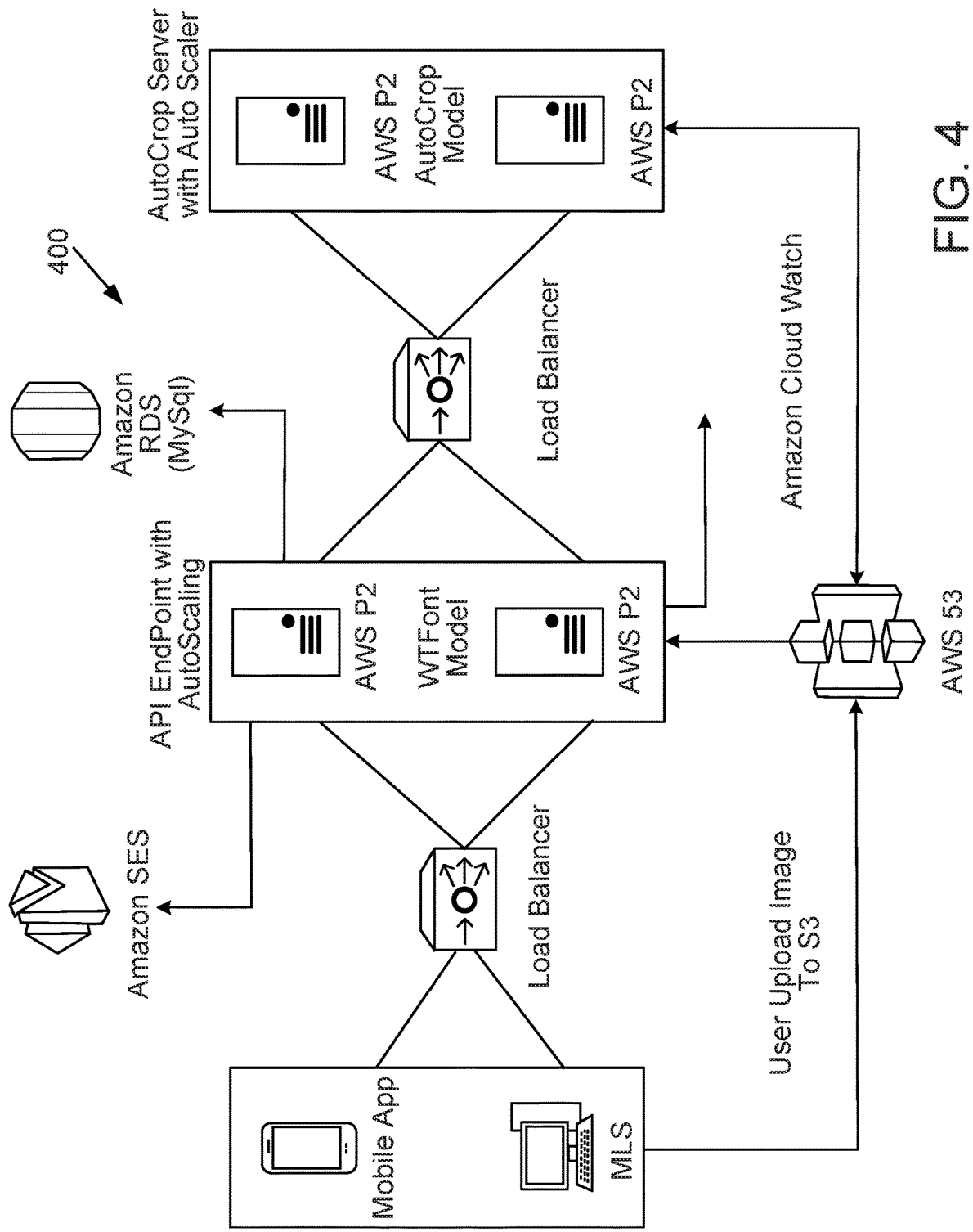
FIG. 4 is an architectural diagram of a computational environment for identifying fonts.

Referring to FIG. 4, various type of computing device architectures may be employed to collect, process, and output information associated with identifying fonts through a machine learning system. For example, an Internet based system 400 (e.g., a cloud based system) maybe used in which operations are distributed to a collection of devices. Such architectures may operate by using one or more systems; for example, the system 400 may use a network of remote servers hosted on the Internet to store, manage, and process data. In some arrangements, the system may employ local servers in concert with the network of remote servers.

Figure 5:
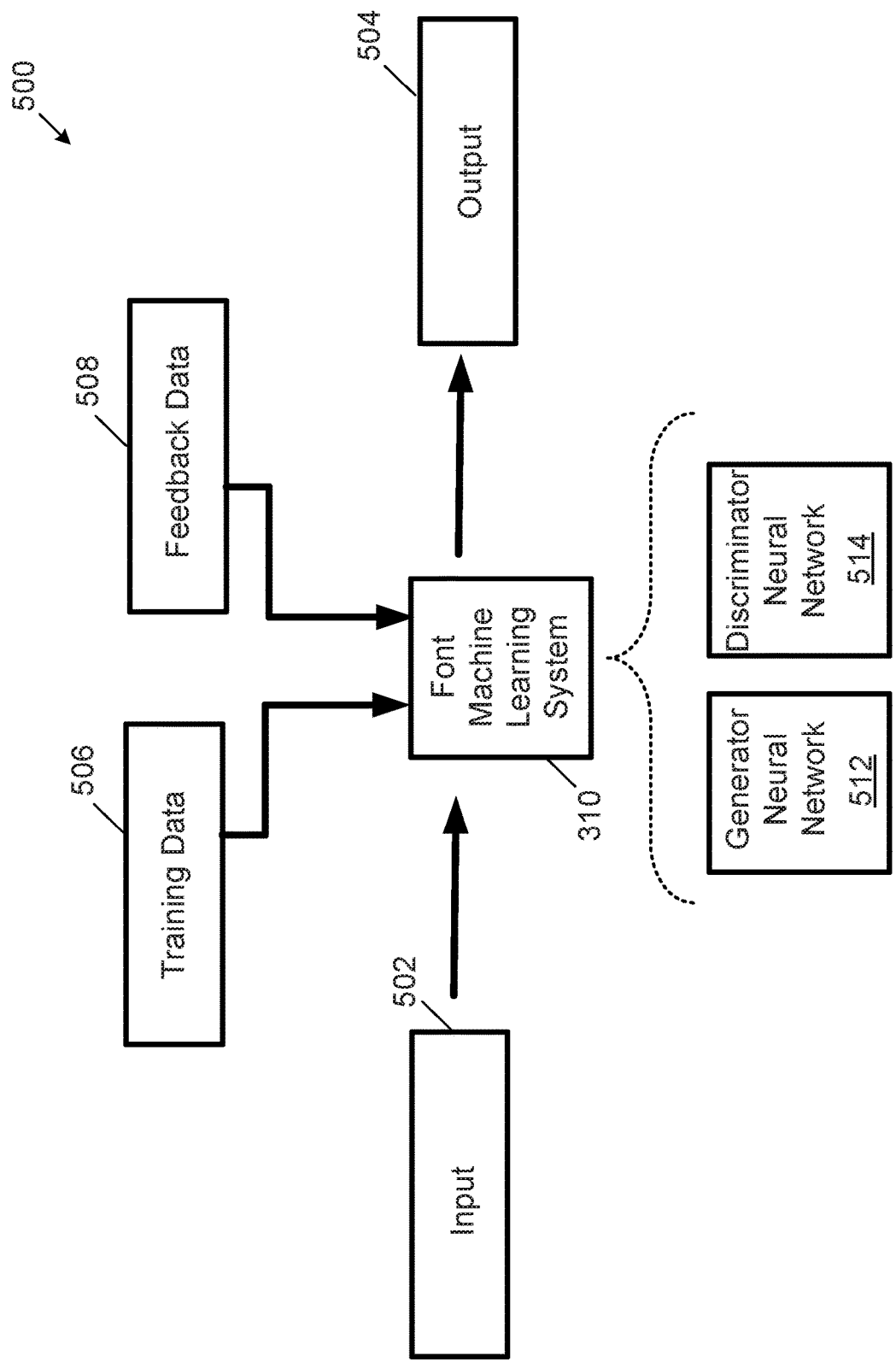
FIG. 5 is a dataflow diagram that includes a machine learning system.

Referring to FIG. 5, a block diagram 500 is presented that provides a graphical representation of the functionality of the font machine learning system 310 (shown in FIG. 3). Prior to using the learning system 310 to process an input 502 (e.g., an image that includes a font to be identified) to produce an output 504 (e.g., a vector of 133,000 elements representing the level of confidence that a corresponding font matches the input font), the learning system needs to be trained. Various types of training data 506 may be used to prepare the font machine learning system 310 to identify fonts of interest to an end user (e.g., potential licensees of the identified font or fonts). For example, images of fonts in pristine condition and images of fonts distorted (e.g., by one or more synthetic distortion techniques, real world conditions, etc.) may be employed. In some arrangements, an initial set of font images (e.g., that represent 14,000 fonts) are used to start the training of the system and then images representing the remainder fonts (e.g., 133,000–14,000=119,000 fonts) are used via a transfer learning technique to scale-up learning of the system (e.g., by adjusting a classifier of the system, fine-tuning weights of the trained system through backpropagation, etc.). In some instances, images may be used multiple times for system training; for example, an image may present a font (e.g., font character) in a pristine condition and then be distorted (using one or more synthetic distortion techniques) to provide the font in one or more other forms. In some arrangements feedback data 508 can also be provided to the font machine learning system to further improve training. In some arrangements, font imagery may be augmented (e.g., distorted) based on one or more conditions (e.g., predefined conditions) such as characteristics of the fonts. For example, a font that visually represents characters with thin line strokes (e.g., a light weight font) may be augmented with relatively minor visual adjustments. Alternatively, a font that presents characters with thick bold lines may be augmented (e.g., distorted) by introducing more bold and easily noticeable visual adjustments (e.g., drastically increasing the darkness or thickness of character lines). In another example, a font that presents characters as having visually hollow segments can be augmented (e.g., distorted) differently that a font that presents characters with completely visually solid segments. Other types of conditions (e.g., predefined conditions) may be employed for directing synthetic augmentation. For example, the content presented by one or more fonts, characteristics of one or more fonts (e.g., character size, style of the font such as bold, italic, etc.), etc. may be used. The use of the font (or fonts) within the environment being presented may also provide a condition or conditions for augmentation. The location, position, orientation, etc. of a font within an environment (e.g., positioned in the foreground, background, etc.) can be used to define on or more conditions. The content of the imagery separate from the font can also be used to define one of more conditions; for example, contrast, brightness, color differences, between the a font and the surround imagery may be used to determine conditions.

The training data 506 may also include segments of one training image. For example, one image may be segmented into five separate images that focus on different areas of the original image. Such image segmenting can be used when the machine learning system predicts a font from an input image. For prediction operations, a prediction result (e.g., a 133,000 element output vector) can be attained for each segment and an overall result determined (e.g., by averaging the individual results) to improve prediction accuracy. One image may be cropped from the original image to focus upon the upper left quadrant of the original image while three other segments may be cropped to focus on the upper right, lower left, and lower right portions of the original image, respectively. A fifth image segment may be producing by cropping the original image to focus upon the central portion of the original image. Various sizes and shapes may be used to create these segments; for example the original image may be of a particular size (e.g., 224 by 224 pixels, 120 by 120 pixels, etc.) while the segments are of lesser size (e.g., 105 by 105 pixels). In some arrangements, the segments may include overlapping content or non-overlapping content may be included in each segment. While the original image and the cropped segments may be square shaped, in some instances the images may be rectangular or have another type of shape.

In one arrangement, after initial training with the first set of fonts (e.g., 14,000 fonts), for each new font used in the subsequent training (each remaining of the 133,000 fonts), operations are executed (by the font identifier 204) to determine the most similar font from the first set initially used to train the system (e.g., the most similar font present in the 14,000 fonts). To determine which font is most similar, one or more techniques may be employed, for example, techniques including machine learning system based techniques may be used as described in U.S. patent application Ser. No. 14/694,494, filed Apr. 23, 2015, entitled "Using Similarity for Grouping Fonts and Individuals for Recommendations", U.S. patent application Ser. No. 14/690,260, filed Apr. 17, 2015 entitled "Pairing Fonts for Presentation", U.S. Pat. No. 9,317,777, issued Apr. 19, 2016, entitled "Analyzing Font Similarity for Presentation", and U.S. Pat. No. 9,805,288, to be issued Oct. 31, 2017, entitled "Analyzing Font Similarity for Presentation", each of which are incorporated by reference in the entirety herein. Upon determining which font from the initial set is most similar, associated information (e.g., weights of the last layer for this identified font) are used for establishing this new font in the machine learning system (e.g., copy the weights to a newly added connection for this new font). By determining a similar font, and using information to assist the additional training (e.g., random weights are not employed), the font machine learning system 310 continues its training in an expedited manner. Other types of similarity techniques can be employed by the system. For example, comparisons (e.g., distance calculations) may be performed on one or more layers before the output layer. In one arrangement, the layer located before the output layer can be considered as feature space (e.g., a 1000 dimension feature space) and executing comparisons for different system inputs can provide a similarity measure. Along with distance measurements between the two feature spaces (for two inputs) other types of calculations such as measure cosine similarity can be employed.

Similarity calculations may be used for other operations associated with the font machine learning system 310. In some instances, accuracy may degrade when scaling the training from a first set of training fonts (e.g., 14,000) to the full font complement (e.g., of remainder of the 133,000 fonts). This accuracy drop may be caused by having a significant number of similar fonts being used for training. For example, many font variants (e.g., hundreds) of one font (e.g., Helvetica) may be represented in the system, and a newly introduced font may appear associated with a number of the font variants. By employing one or more mathematical metrics, convergence can be gauged. For example, similarity accuracy can be measured by using similarity techniques such as techniques incorporated by reference above. In one arrangement, accuracy can be calculated using the similarity techniques to determine the similarity of predicted font (provided as the system output 504) and an identified (labeled) font (used to train the system). If similar, the prediction can be considered as being correct. In another situation, only a limited number of training fonts that are provided in distorted imagery (e.g., captured in real-world conditions) are identified (e.g., only 500 fonts are identified—or labeled). Due to this limitation, system accuracy may decrease (e.g., for the 133,000 possible prediction outputs from the machine). To improve accuracy, only the limited number of labeled fonts (e.g., the 500 labeled fonts) are considered active and all other possible predictions are not considered active (e.g., and are assigned prediction values of zero). Using this technique, accuracy can improve as the training of the machine learning system scales up. In some implementations the result with the highest probability is the expected result (Top-1 accuracy). In some cases, the Top-1 accuracy can be based on synthetic data. Implementing a model in which the five highest probabilities match the expected result can also be employed (Top-5 accuracy). In some cases, the Top-5 accuracy can be based on synthetic data.

The similarity techniques may also be used for measuring the quality of segmenting an input image (e.g., quality of cropping of an input image). For example, upon receiving a page of text, graphics, etc., the page can be cropped into segments (e.g., rectangular shaped segments) by the font identifier 204 such that each segment contains the text of the page. In many cases, the text of the segments contain similar fonts, if not the same font. Each text segment is input into the font machine learning system 310 and a number of predicted fonts is output (K predicted fonts). For two crops, distance values can be calculated between the predicted fonts (the K predicted fonts). An estimated value (e.g., mean value) for the distance values (K*K values) is calculated to identify a threshold value. In some instances, the estimated value is multiplied by a constant (e.g., value 1.0, etc.) for the threshold value. If the top predictions for two crops have a distance value less than this threshold value, the crops can be considered as containing similar fonts. If the distance value is above the threshold value, the two crops can be considered as containing different fonts.

Similarity calculations can also be executed to determine the quality of a crop. For example, a segment of text attained through the cropping of an image can be input into the machine learning system. Techniques such as Fast Region-based Convolutional Network method (Fast R-CNN), Faster Region-based Convolutional Network method (Faster R-CNN), etc. can be used to classify objects (e.g., detect rectangular regions that contain text). The output of the system provides a number of predicted fonts (e.g., K predicted fonts) for the cropped segment. Similarity calculations may be executed among the K predicted fonts. If the calculations report that the K predicted fonts are similar, the segment can be considered as being attained from a good quality crop. If the K predicted fonts lack similarity, the cropping operations used to attain the segment can be considered poor. If the similarity calculations report that non-similar fonts are present, corrective operations may be executed (e.g., cropping operations may be repeated to attain another segment for re-testing for similarity of predicted fonts). In some arrangements, a numerical value may be assigned to the crop quality; for example, a value of one may indicate that a good segment has been attained from the cropping operations, and a value of zero may indicate poor cropping operations may have produced a segment with dissimilar predicted fonts.

As described above, the font machine learning system 310 outputs prediction values for each of the potential fonts (e.g., each of the 133,000 fonts represented as elements of an output vector). Typically, the numerical values are assigned to each potential font to represent the prediction. Additionally, these numerical values are scaled so the sum has a value of one. However, give the considerably large number of potential fonts (e.g., again, 133,000 fonts), each individual value can be rather small and difficult to interpret (e.g., identify differences from other values). Further, even values that represent the top predicted values can be small and difficult to distinguish one from another. In some arrangements, a software function (e.g., a Softmax function) causes the sum of the prediction values to equal a value of one. One or more techniques may be provided by the font machine learning system 310 to address these numerical values and improve their interpretation. For example, only a predefined number of top predicted fonts are assigned a numerical value to represent the level of confidence. In one arrangement, the top 500 predicted fonts are assigned a numerical value and the remaining fonts (e.g., 133,000−500=132,500 fonts) are assigned a numerical value of zero. Further, the numerical values are assigned to the top 500 predicted fonts such that the sum of the numerical values has a value of one. In one implementation, the lower font predictions (e.g., 133,000−500=132,500 fonts) are zeroed out before the Softmax function is applied. In effect, the top N (e.g., 500) predicted fonts are boosted in value to assist with further processing (e.g., identifying top predictions, prediction distributions, etc.). In some arrangements, corresponding elements of multiple output vectors are summed (in which each output vector represents a different input image, a different portion of an image, etc.). Through the summing operation, fonts common among the images can be identified, for example.

As mentioned above, various techniques may be employed to distort images for increasing the robustness of the font machine learning system 310 (e.g., the system trains on less than pristine images of fonts to improve the system's ability to detect the fonts in "real world" images such as photographs). Since the fonts are known prior to being distorted through the synthetic techniques, each of the underlying fonts is known and can be identified to the font machine learning system 310. Along with these synthetically distorted fonts, the robustness of the font machine learning system 310 can be increased by providing actual real-world images of fonts (e.g., from captured images provided by end users, etc.). In many cases, the underlying fonts present in these real-world images are unknown or at the least not identified when provided to the system for training. As such, the system will develop its own identity of these fonts. To improve robustness, various amounts of these unlabeled real-world font images may be provided during training of the system. For example, in some training techniques a particular number of images are provided for each training session. Image batches of 16 images, 32 images, 64 images, etc. can be input for a training session. Of these batches, a percentage of the images have identified fonts (e.g., be labeled) and the images may be in pristine condition or synthetically distorted. Font identification is not provided with another percentage of the images; for example, these images may be distorted by real-world condition and the font is unknown. For this later percentage of images, the learning machine system defines its own identity of the font (e.g., via a process known as pseudo labeling). For example, 75% of the images may be provided with font identification (e.g., a pristine image or a synthetically distorted image in which the base font is known) and 25% may be images with unlabeled fonts for which the machine learning system defines a label for the represented font. Other percentages of these two types of labeled and pseudo labeled images may also be employed to increase system robustness along with improving overall decision making by the system.

System variations may also include different hardware implementations and the different uses of the system hardware. For example, multiple instances of the font machine learning system 310 may be executed through the use of a single graphical processing unit (GPU). In such an implementations, multiple system clients (each operating with one machine learning system) may be served by a single GPU. In other arrangements, multiple GPU's may be used. Similarly, under some conditions, a single instance of the machine learning system may be capable of serving multiple clients. Based upon changing conditions, multiple instances of a machine learning system may be employed to handle an increased workload from multiple clients. For example, environmental conditions (e.g., system throughput), client based conditions (e.g., number of requests received per client), hardware conditions (e.g., GPU usage, memory use, etc.) can trigger multiple instances of the system to be employed, increase the number of GPU's being used, etc. Similar to taking steps to react to an increase in processing capability, adjustments can be made when less processing is needed. For example, the number of instances of a machine learning system being used may be decreased along with the number of GPU's needed to service the clients. Other types of processors may be used in place of the GPU's or in concert with them (e.g., combinations of different types of processors). For example, central processing units (CPU's), processors developed for machine learning use (e.g., an application-specific integrated circuit (ASIC) developed for machine learning and known as a tensor processing unit (TPU)), etc. may be employed. Similar to GPU's one or more models may be provided by these other types of processors, either independently or in concert with other processors.

One or more techniques can be employed to improve the training of the font machine learning system 310. For example, one improvement that results in higher font identifying accuracy is provided by synthetically generating training images that include some amount of distortion. For example, after a training image is provided to the machine leaning system, one or more distorted versions of the image may also be provided to the system during the training cycle. For some fonts, which can be considered lighter in color or having hollow features can be used for training without being distorted. As such, any font considered has having these features can used for training without further alternating. For other types of training fonts, along with using the font unaltered version of the font, a synthetically distorted version of the font can be used for training the font machine learning system 310. Various types of distortions can be applied to the fonts; for example, compression techniques (e.g., JPEG compression) can be applied. One or more levels of shadowing can be applied to a training font sample. Manipulating an image of a training font such that shapes of the font are significantly distorted can be used to define one or more training images. Blurring can be applied to imagery to create distortions; for example, a Gaussian blur can give an overall smoothing appearance to an image of a font. Motion blurring, can also be applied in another example, in which streaking appears in the imagery to present the effect of rapid object movement. For still another feature, Gaussian noise can be applied as a type of distortion and cause the blurring of fine-scaled image edges and details. Other types of image adjustments may be applied as a type of visual distortion; for example, images may be rotated about one or more axis (e.g., about the x, y, and/or z-axis). Skewing an image in one or more manners so the underlying image appears to be misaligned in one or multiple directions (e.g., slanted) can provide another type of distortion. The aspect ratio of an image, in which the ratio of the width to the height of the image is adjusted, can provide a number of different type of images of a font to assist with training. Distortion may also be applied by filtering all or a portion of an image and using one or more filtered version of the image for system training. For example, edge detection may be performed on an image, for example, to retain or remove high spatial frequency content of an image. Other types of image processing may also be executed; perspective transformation can be employed, which is associated with converting 3D imagery into 2D imagery such that objects that are represented as being closer to the viewer appear larger than an object represented as being further from the viewer.

In some arrangements, data processing (e.g., image processing) libraries may be employed for distorting the training images. For example, some libraries may provide functions that adjust the shape, geometry, etc. of text (e.g., position the text to appear in a circular formation). Different coloring schemes may also be applied to create additional training images; for example, color substitution techniques, introducing and applying gradients to one or more colors, etc. can be executed through the use of libraries. Through the use of libraries, different types of fonts may be introduced into training imagery. For example, hollow fonts and outline fonts may be introduced to assist with training. Different attributes of font glyphs, characters, etc. may be adjust to provide distortion. For example, random stroke widths may be applied to portions (e.g., stems) characters or entire characters to introduce distortion. From the different types of distortions described above, each may be used to create a training image. To further increase the accuracy of the machine learning system, two or more of the distortion techniques may be used in concert to create additional training imagery.

Similar to using distortion to create additional training imagery, other types of content may be employed. For example, different types of background imagery may be used to create imagery that includes different text (e.g., using different fonts) in the foreground. Real world photographic background images may be used as backgrounds and distorted text (represented in one or more fonts) can be used for image creation. Text may be positioned various location in images including on image borders. In some training images, portions of text may be clipped so only a portion of the text (e.g., part of a character, word, phrase, etc.) is present. As such, different cropping schemes may be utilized for training the machine learning system. As mentioned above, for some training images, text is distorted in one manner or multiple manners. In a similar fashion, other portions of the images such as background imagery (e.g., photographic imagery) may be distorted once or in multiple instances. Further, for some examples, the distortion may take a two-step process, first an image is created that includes distorted text (and used to train the system), and then the image (e.g., background image) is distorted using one or more image processing techniques (e.g., JPEG compression, applying Gaussian noise, etc.).

To implement the font machine learning system 310, one or more machine learning techniques may be employed. For example, supervised learning techniques may be implemented in which training is based on a desired output that is known for an input. Supervised learning can be considered an attempt to map inputs to outputs and then estimate outputs for previously unseen inputs (a newly introduced input). Unsupervised learning techniques may also be employed in which training is provided from known inputs but unknown outputs. Reinforcement learning techniques may also be used in which the system can be considered as learning from consequences of actions taken (e.g., inputs values are known). In some arrangements, the implemented technique may employ two or more of these methodologies.

In some arrangements, neural network techniques may be implemented using the data representing the images (e.g., a matrix of numerical values that represent visual elements such as pixels of an image, etc.) to invoke training algorithms for automatically learning the images and related information. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to training data. By using the image data (e.g., attribute vectors), a function may be defined that quantifies error (e.g., a squared error function used in regression techniques). By minimizing error, a neural network may be developed that is capable of determining attributes for an input image. One or more techniques may be employed by the machine learning system, for example, backpropagation techniques can be used to calculate the error contribution of each neuron after a batch of images is processed. Stochastic gradient descent, also known as incremental gradient descent, can be used by the machine learning system as a stochastic approximation of the gradient descent optimization and iterative method to minimize an objective function. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implements to reduce its effects.

One type of machine learning referred to as deep learning may be utilized in which a set of algorithms attempt to model high-level abstractions in data by using model architectures, with complex structures or otherwise, composed of multiple non-linear transformations. Such deep learning techniques can be considered as being based on learning representations of data. In general, deep learning techniques can be considered as using a cascade of many layers of nonlinear processing units for feature extraction and transformation. The next layer uses the output from the previous layer as input. In some arrangements, a layer can look back one or multiple layers for its input. The algorithms may be supervised, unsupervised, combinations of supervised and unsupervised, etc. The techniques are based on the learning of multiple levels of features or representations of the data (e.g., image attributes). As such, multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer. In one example, the font machine learning system 310 uses one or more convolutional neural networks (CNN), which when trained can output a font classification for an input image that includes a font. Various types of CCN based systems can be used that have different number of layers; for example the font machine learning system 310 can a fifty-layer deep neutral network architecture (e.g., a ResNet50 architecture) or architectures that employ a different number of layers (e.g., ResNet150, ResNet 152, VGGNet 16, VGGNet 19, InceptionNet V3, etc.) that trained can output a font classification for an input image that includes a font.

One type of machine learning referred to as deep learning may be utilized in which a set of algorithms attempt to model high-level abstractions in data by using model architectures, with complex structures or otherwise, composed of multiple non-linear transformations. Such deep learning techniques can be considered as being based on learning representations of data. In general, deep learning techniques can be considered as using a cascade of many layers of nonlinear processing units for feature extraction and transformation. The next layer uses the output from the previous layer as input. The algorithms may be supervised, unsupervised, combinations of supervised and unsupervised, etc. The techniques are based on the learning of multiple levels of features or representations of the data (e.g., image attributes). As such, multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Other types of artificial intelligence techniques may be employed about the font identifier 204 (shown in FIG. 2 and FIG. 3). For example, the font machine learning system 310 can use neural networks such as a generative adversarial networks (GANs) in its machine learning architecture (e.g., an unsupervised machine learning architecture). In general, a GAN includes a generator neural network 512 that generates data (e.g., an augmented image such as a distorted image that includes one or more fonts input into the generator) that is evaluated by a discriminator neural network 514 for authenticity (e.g., determine if the imagery is real or synthetic). In other words, the discriminator neural network 514 attempts to determine if input imagery is synthetically created (provided by the generator 512) or real imagery (e.g., a captured image). In some arrangements, font imagery from the training data 506 is used by the generator 512 to produce augmented imagery. The discriminator 514 then evaluates the augmented image and produces an output that represents if the discriminator considers the augmented imagery to be synthetically produced or real (e.g., captured imagery). In one example, the output of the discriminator 514 produces a level that represents a probability value that ranges from 0 to 1; in which 1 represents that the discriminator considers the imagery to be real (e.g., captured imagery) and 0 which represents when the discriminator considers the input imagery to synthetically produced (by the generator 512). This output of the discriminator 514 can then be analyzed (e.g., by the font machine learning system 310 or another system) to determine if the analysis of the discriminator 514 is correct. By including these determinations in the feedback data 508, the accuracy of the font machine learning system 310 can be improved. For example, this determination information can be provided to the generator neural network 512, for example, to identify instances where the discriminator 514 had difficulties and thereby cause more augmented imagery in this area to be produced by the generator for improving operations of the discriminator. The feedback information can also be provided to the discriminator 514, thereby allowing the accuracy of the discriminator to improve through learning if its determination were correct or incorrect.

One or more metrics may be employed to determine if the generator neural network 512 has reach an improved state (e.g., an optimized state). Upon reaching this state, the generator 512 may be used to train the font machine learning system 310. For example, the generator can used to train one or more classifiers included in the font machine learning system 310. Using input 502, training data 506, etc., the generator 512 can produce a large variety of imagery (e.g., distorted images that contain one or more fonts) to increase the capability of the font machine learning system.

Various implementations for GAN generators and discriminators may be used; for example, the discriminator neural network 512 can use a convolutional neural network that categorizes input images with a binomial classifier that labels the images as genuine or not. The generator neural network 514 can use an inverse convolutional (or deconvolutional) neural network that takes a vector of random noise and upsamples the vector data to an image to augment the image.

Figure 6:
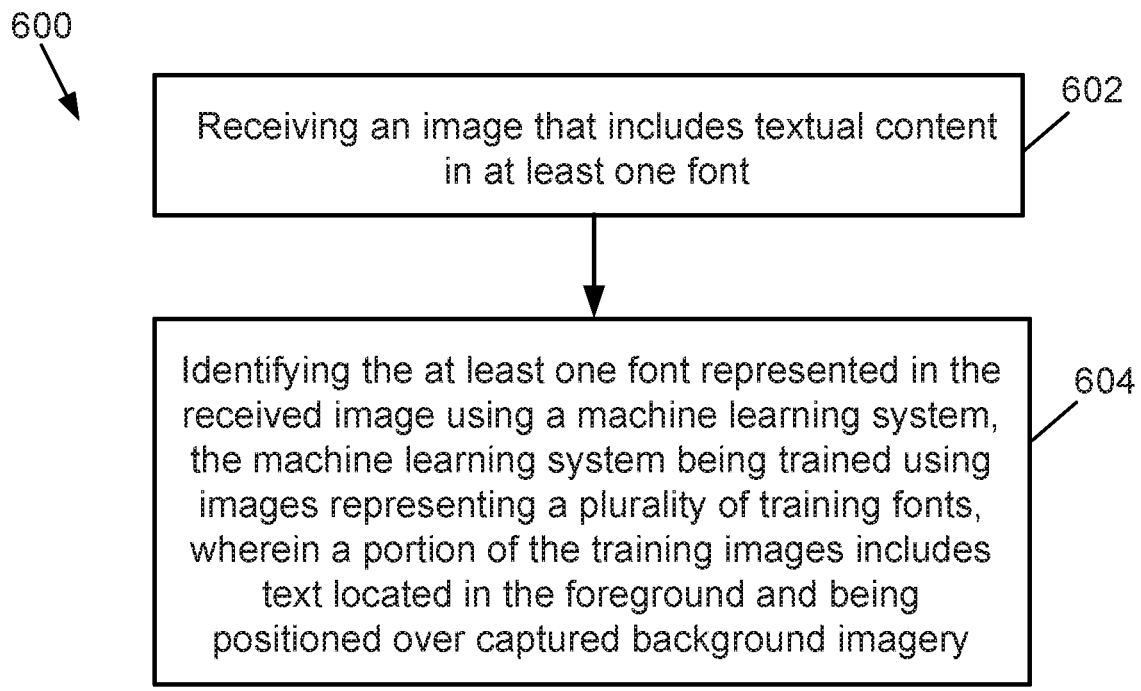
FIGS. 6 and 7 are flowcharts of operations of a font identifier.

Referring to FIG. 6, a flowchart 600 represents operations of an image selector (e.g., the font identifier 204 shown in FIG. 2 and FIG. 3) being executed by a computing device (e.g., the computer system 200). Operations of the font identifier 204 are typically executed by a single computing device; however, operations may be executed by multiple computing devices. Along with being executed at a single site, the execution of operations may be distributed among two or more locations. For example, a portion of the operations may be executed at a location remote from the location of the computer system 200, etc.

Operations of the font identifier 204 may include receiving 602 an image that includes textual content in at least one font. For example, an image may be received that is represented by a two-dimensional matrix of numerical values and each value represents a visual property (e.g., color) that can be assigned to a pixel of a display. Various file formats (e.g., "jpeg", ".pdf", etc.) may be employed to receive the image data. Operations of the font identifier may also include identifying 604 the at least one font represented in the received image using a machine learning system, the machine learning system being trained using images representing a plurality of training fonts. A portion of the training images includes text located in the foreground and being positioned over captured background imagery. For example, a collection of images including training fonts (e.g., synthetically distorted fonts, undistorted fonts, etc.) can be positioned over images that have been captured (e.g., by an image capture device such as a camera). The captured imagery may be distorted due to image capture conditions, capture equipment, etc., may be used for training a machine learning system such as the font machine learning system 310. Trained with such data, the machine learning system can efficiently identify fonts in images that are in less than pristine condition.

Figure 7:
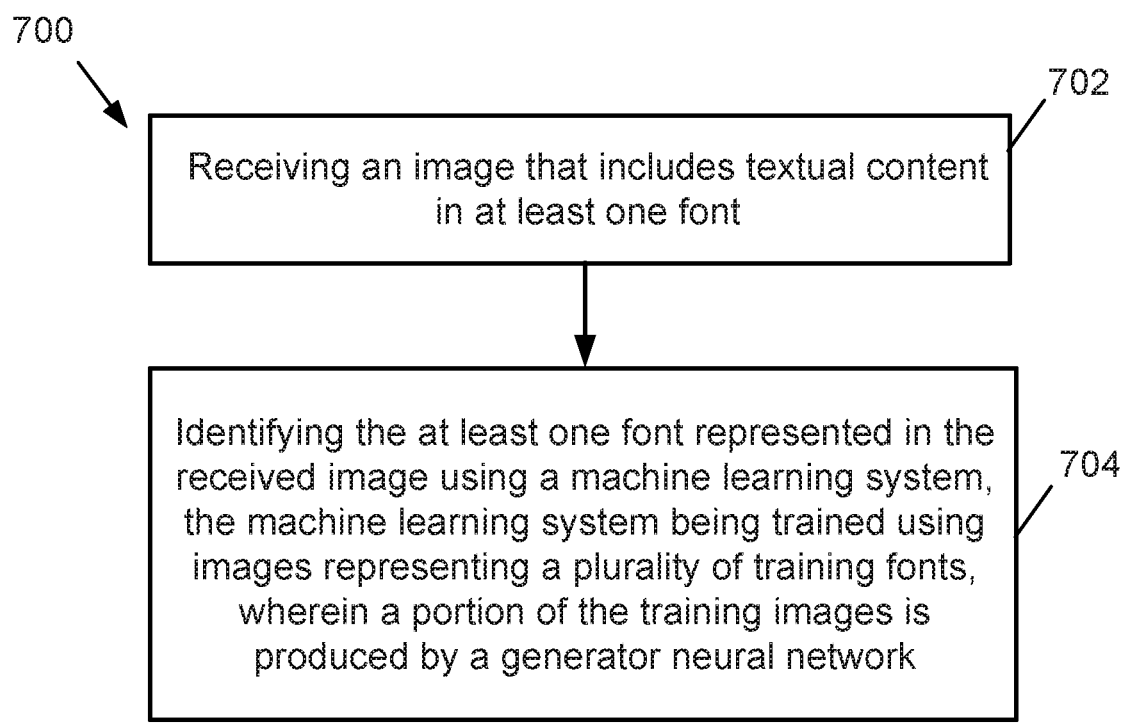

Referring to FIG. 7, a flowchart 700 represents operations of an image selector (e.g., the font identifier 204 shown in FIG. 2 and FIG. 3) being executed by a computing device (e.g., the computer system 200). Operations of the font identifier 204 are typically executed by a single computing device; however, operations may be executed by multiple computing devices. Along with being executed at a single site, the execution of operations may be distributed among two or more locations. For example, a portion of the operations may be executed at a location remote from the location of the computer system 200, etc.

Operations of the font identifier 204 may include receiving 702 an image that includes textual content in at least one font. For example, an image may be received that is represented by a two-dimensional matrix of numerical values and each value represents a visual property (e.g., color) that can be assigned to a pixel of a display. Various file formats (e.g., "jpeg", ".pdf", etc.) may be employed to receive the image data. Operations of the font identifier may also include identifying 704 the at least one font represented in the received image using a machine learning system, the machine learning system being trained using images representing a plurality of training fonts. A portion of the training images is produced by a generator neural network. A generator neural network of a GAN may be used to augment (e.g., distort) imagery a textual characters represented in a font. This augmented imagery may be provided to a discriminator neural network (of the GAN). Using these images, the discriminator can evaluate the augmented imagery and attempt to determine if the imagery is real (e.g., captured) or synthetic (e.g., prepared by a generator neural network). These determinations (whether correct or incorrect), can be used to improve the generator neural network (e.g., to produce augmented imagery to further test the discriminator) and improve the discriminator neural network (e.g., assist the discriminator is making correct determinations about future augmented imagery provided by the generator). The improved generator (e.g., an optimized generator) can then be used to provide imagery for training a machine learning system, for example, to identify one or more fonts in various types of images that are in less than pristine condition (e.g., capture images that are distorted).

Figure 8:
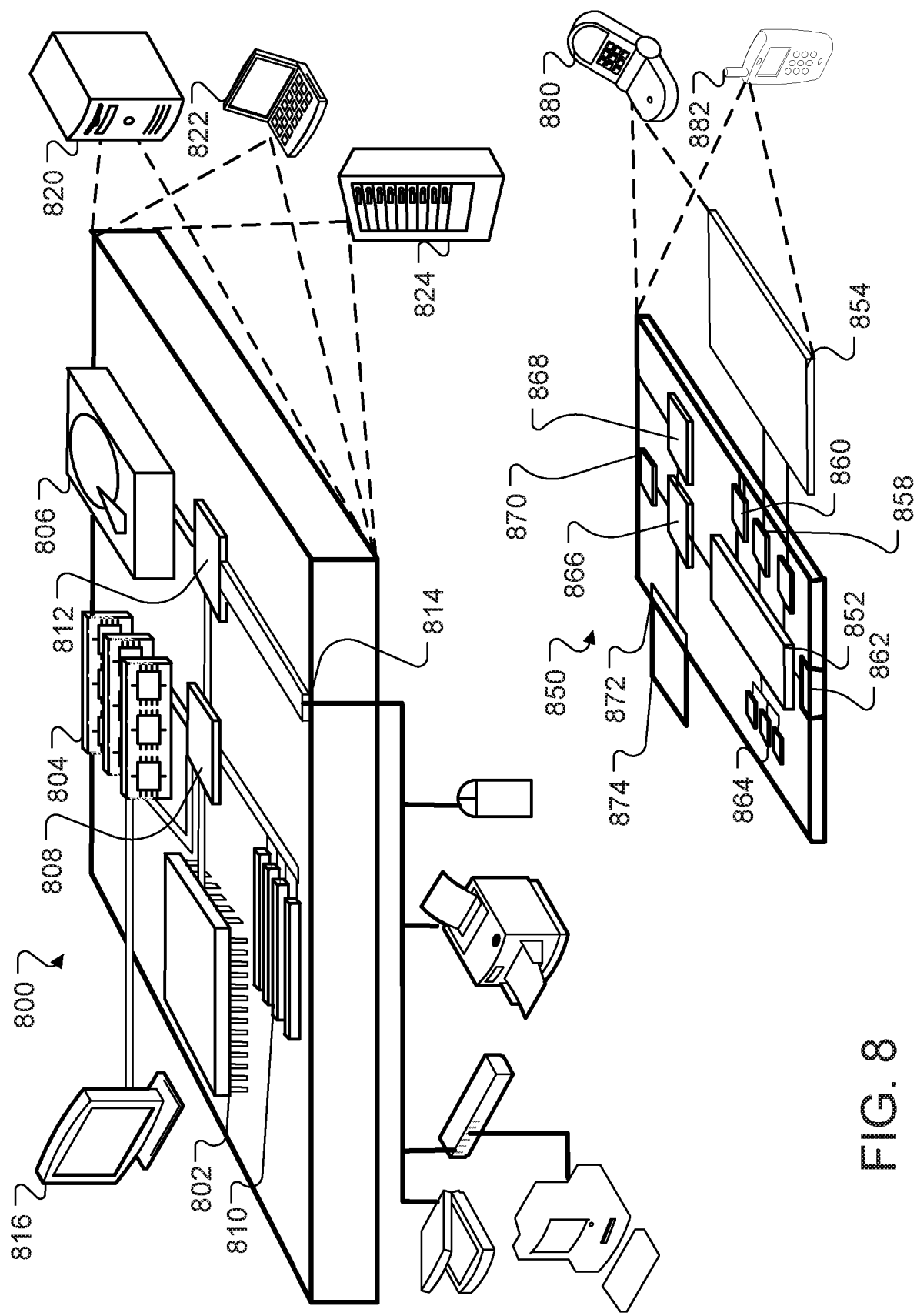
FIG. 8 illustrates an example of a computing device and a mobile computing device that can be used to implement the techniques described here.

FIG. 8 shows an example of example computing device 800 and example mobile computing device 850, which can be used to implement the techniques described herein. For example, a portion or all of the operations of font identifier 204 (shown in FIG. 2) may be executed by the computing device 800 and/or the mobile computing device 850. Computing device 800 is intended to represent various forms of digital computers, including, e.g., laptops, desktops, workstations, personal digital assistants, servers, blade servers, mainframes, and other appropriate computers. Computing device 850 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 800 includes processor 802, memory 804, storage device 806, high-speed interface 808 connecting to memory 804 and high-speed expansion ports 810, and low speed interface 812 connecting to low speed bus 814 and storage device 806. Each of components 802, 804, 806, 808, 810, and 812, are interconnected using various busses, and can be mounted on a common motherboard or in other manners as appropriate. Processor 802 can process instructions for execution within computing device 800, including instructions stored in memory 804 or on storage device 806 to display graphical data for a GUI on an external input/output device, including, e.g., display 816 coupled to high speed interface 808. In other implementations, multiple processors and/or multiple busses can be used, as appropriate, along with multiple memories and types of memory. Also, multiple computing devices 800 can be connected, with each device providing portions of the necessary operations (e.g., as a server bank, a group of blade servers, or a multi-processor system).

Memory 804 stores data within computing device 800. In one implementation, memory 804 is a volatile memory unit or units. In another implementation, memory 804 is a non-volatile memory unit or units. Memory 804 also can be another form of computer-readable medium (e.g., a magnetic or optical disk. Memory 804 may be non-transitory.)

Storage device 806 is capable of providing mass storage for computing device 700. In one implementation, storage device 806 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 804, storage device 806, memory on processor 802, and the like.)

High-speed controller 808 manages bandwidth-intensive operations for computing device 800, while low speed controller 812 manages lower bandwidth-intensive operations. Such allocation of functions is an example only. In one implementation, high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 800 can be implemented in a number of different forms, as shown in the figure. For example, it can be implemented as standard server 820, or multiple times in a group of such servers. It also can be implemented as part of rack server system 824. In addition or as an alternative, it can be implemented in a personal computer (e.g., laptop computer 822.) In some examples, components from computing device 800 can be combined with other components in a mobile device (not shown), e.g., device 850. Each of such devices can contain one or more of computing device 800, 850, and an entire system can be made up of multiple computing devices 800, 850 communicating with each other.

Computing device 850 includes processor 852, memory 864, an input/output device (e.g., display 854, communication interface 866, and transceiver 868) among other components. Device 850 also can be provided with a storage device, (e.g., a microdrive or other device) to provide additional storage. Each of components 850, 852, 864, 854, 866, and 868, are interconnected using various buses, and several of the components can be mounted on a common motherboard or in other manners as appropriate.

Processor 852 can execute instructions within computing device 850, including instructions stored in memory 864. The processor can be implemented as a chipset of chips that include separate and multiple analog and digital processors. The processor can provide, for example, for coordination of the other components of device 850, e.g., control of user interfaces, applications run by device 850, and wireless communication by device 850.

Processor 852 can communicate with a user through control interface 858 and display interface 856 coupled to display 854. Display 854 can be, for example, a TFT LCD (Thin-Film-Transistor Liquid Crystal Display) or an OLED (Organic Light Emitting Diode) display, or other appropriate display technology. Display interface 856 can comprise appropriate circuitry for driving display 854 to present graphical and other data to a user. Control interface 858 can receive commands from a user and convert them for submission to processor 852. In addition, external interface 862 can communicate with processor 842, so as to enable near area communication of device 850 with other devices. External interface 862 can provide, for example, for wired communication in some implementations, or for wireless communication in other implementations, and multiple interfaces also can be used.

Memory 864 stores data within computing device 850. Memory 864 can be implemented as one or more of a computer-readable medium or media, a volatile memory unit or units, or a non-volatile memory unit or units. Expansion memory 874 also can be provided and connected to device 850 through expansion interface 872, which can include, for example, a SIMM (Single In Line Memory Module) card interface. Such expansion memory 874 can provide extra storage space for device 850, or also can store applications or other data for device 850. Specifically, expansion memory 874 can include instructions to carry out or supplement the processes described above, and can include secure data also. Thus, for example, expansion memory 874 can be provided as a security module for device 850, and can be programmed with instructions that permit secure use of device 850. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 864, expansion memory 874, and/or memory on processor 852), which can be received, for example, over transceiver 868 or external interface 862.

Device 850 can communicate wirelessly through communication interface 866, which can include digital signal processing circuitry where necessary. Communication interface 866 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 868. In addition, short-range communication can occur, e.g., using a Bluetooth®, WiFi, or other such transceiver (not shown). In addition, GPS (Global Positioning System) receiver module 870 can provide additional navigation- and location-related wireless data to device 850, which can be used as appropriate by applications running on device 850. Sensors and modules such as cameras, microphones, compasses, accelerators (for orientation sensing), etc. may be included in the device.

Device 850 also can communicate audibly using audio codec 860, which can receive spoken data from a user and convert it to usable digital data. Audio codec 860 can likewise generate audible sound for a user, (e.g., through a speaker in a handset of device 850.) Such sound can include sound from voice telephone calls, can include recorded sound (e.g., voice messages, music files, and the like) and also can include sound generated by applications operating on device 850.

Computing device 850 can be implemented in a number of different forms, as shown in the figure. For example, it can be implemented as cellular telephone 880. It also can be implemented as part of smartphone 882, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
    receiving an image that includes textual content in at least one font; and
    identifying the at least one font represented in the received image using a machine learning system, the machine learning system being trained using images representing a plurality of training fonts, wherein a portion of the training images includes synthetic text located in the foreground and being positioned over captured background imagery, and a portion of the training images is distorted when captured by at least one of image capture conditions and capture equipment, wherein the identified at least one font is represented by one element of a plurality of elements of a data vector provided by the machine learning system.

2. The computing device implemented method of claim 1, wherein the text located in the foreground is synthetically augmented.

3. The computing device implemented method of claim 2, wherein synthetic augmentation is provided in a two-step process.

4. The computing device implemented method of claim 2, wherein the text is synthetically augmented based upon one or more predefined conditions.

5. The computing device implemented method of claim 1, wherein the text located in the foreground is undistorted.

6. The computing device implemented method of claim 1, wherein the captured background imagery is predominately absent text.

7. The computing device implemented method of claim 1, wherein the text located in the foreground is randomly positioned in the portion of training images.

8. The computing device implemented method of claim 1, wherein prior to the text being located in the foreground, a portion of the text is removed.

9. The computing device implemented method of claim 1, wherein the captured background imagery is distorted when captured.

10. The computing device implemented method of claim 1, wherein font similarity is used to identify the at least one font.

11. The computing device implemented method of claim 1, wherein similarity of fonts in multiple image segments is used to identify the at least one font.

12. The computing device implemented method of claim 1, wherein the machine learning system is trained by using transfer learning.

13. The computing device implemented method of claim 1, wherein an output of the machine learning system represents each font used to train the machine learning system.

14. The computing device implemented method of claim 13, wherein the output of the machine learning system provides a level of confidence for each font used to train the machine learning system.

15. The computing device implemented method of claim 1, wherein a subset of the output of the machine learning system is scaled and a remainder of the output is removed.

16. The computing device implemented method of claim 1, wherein some of the training images are absent identification.

17. The computing device implemented method of claim 1, wherein identifying the at least one font represented in the received image using the machine learning system includes using additional images received by the machine learning system.

18. The computing device implemented method of claim 17, wherein outputs of the machine learning system for the received image and the additional images are combined to identify the at least one font.

19. The computing device implemented method of claim 1, wherein the machine learning system comprises a generative adversarial network (GAN).

20. The computing device implemented method of claim 19, wherein the generative adversarial network (GAN) comprises a generator neural network and a discriminator neural network.

21. A system comprising:
a computing device comprising:
a memory configured to store instructions; and
a processor to execute the instructions to perform operations comprising:
receiving an image that includes textual content in at least one font; and
identifying the at least one font represented in the received image using a machine learning system, the machine learning system being trained using images representing a plurality of training fonts, wherein a portion of the training images includes synthetic text located in the foreground and being positioned over captured background imagery, and a portion of the training images is distorted when captured by at least one of image capture conditions and capture equipment, wherein the identified at least one font is represented by one element of a plurality of elements of a data vector provided by the machine learning system.

22. The system of claim 21, wherein the text located in the foreground is synthetically augmented.

23. The system of claim 22, wherein synthetic augmentation is provided in a two-step process.

24. The computing device implemented method of claim 22, wherein the text is synthetically augmented based upon one or more predefined conditions.

25. The system of claim 21, wherein the text located in the foreground is undistorted.

26. The system of claim 21, wherein the captured background imagery is predominately absent text.

27. The system of claim 21, wherein the text located in the foreground is randomly positioned in the portion of training images.

28. The system of claim 21, wherein prior to the text being located in the foreground, a portion of the text is removed.

29. The system of claim 21, wherein the captured background imagery is distorted when captured.

30. The system of claim 21, wherein font similarity is used to identify the at least one font.

31. The system of claim 21, wherein similarity of fonts in multiple image segments is used to identify the at least one font.

32. The system of claim 21, wherein the machine learning system is trained by using transfer learning.

33. The system of claim 21, wherein an output of the machine learning system represents each font used to train the machine learning system.

34. The system of claim 33, wherein the output of the machine learning system provides a level of confidence for each font used to train the machine learning system.

35. The system of claim 21, wherein a subset of the output of the machine learning system is scaled and a remainder of the output is removed.

36. The system of claim 21, wherein some of the training images are absent identification.

37. The system of claim 21, wherein identifying the at least one font represented in the received image using the machine learning system includes using additional images received by the machine learning system.

38. The system of claim 37, wherein outputs of the machine learning system for the received image and the additional images are combined to identify the at least one font.

39. The system of claim 21, wherein the machine learning system comprises a generative adversarial network (GAN).

40. The system of claim 39, wherein the generative adversarial network (GAN) comprises a generator neural network and a discriminator neural network.

41. One or more non-transitory computer readable media storing instructions that are executable by a processing device, and upon such execution cause the processing device to perform operations comprising:
receiving an image that includes textual content in at least one font; and
identifying the at least one font represented in the received image using a machine learning system, the machine learning system being trained using images representing a plurality of training fonts, wherein a portion of the training images includes synthetic text located in the foreground and being positioned over captured background imagery, and a portion of the training images is distorted when captured by at least one of image capture conditions and capture equipment, wherein the identified at least one font is represented by one element of a plurality of elements of a data vector provided by the machine learning system.

42. The non-transitory computer readable media of claim 41, wherein the text located in the foreground is synthetically augmented.

43. The non-transitory computer readable media of claim 42, wherein synthetic augmentation is provided in a two-step process.

44. The non-transitory computer readable media of claim 42, wherein the text is synthetically augmented based upon one or more predefined conditions.

45. The non-transitory computer readable media of claim 41, wherein the text located in the foreground is undistorted.

46. The non-transitory computer readable media of claim 41, wherein the captured background imagery is predominately absent text.

47. The non-transitory computer readable media of claim 41, wherein the text located in the foreground is randomly positioned in the portion of training images.

48. The non-transitory computer readable media of claim 41, wherein prior to the text being located in the foreground, a portion of the text is removed.

49. The non-transitory computer readable media of claim 41, wherein the captured background imagery is distorted when captured.

50. The non-transitory computer readable media of claim 41, wherein font similarity is used to identify the at least one font.

51. The non-transitory computer readable media of claim 41, wherein similarity of fonts in multiple image segments is used to identify the at least one font.

52. The non-transitory computer readable media of claim 41, wherein the machine learning system is trained by using transfer learning.

53. The non-transitory computer readable media of claim 41, wherein an output of the machine learning system represents each font used to train the machine learning system.

54. The non-transitory computer readable media of claim 53, wherein the output of the machine learning system provides a level of confidence for each font used to train the machine learning system.

55. The non-transitory computer readable media of claim 41, wherein a subset of the output of the machine learning system is scaled and a remainder of the output is removed.

56. The non-transitory computer readable media of claim 41, wherein some of the training images are absent identification.

57. The non-transitory computer readable media of claim 41, wherein identifying the at least one font represented in the received image using the machine learning system includes using additional images received by the machine learning system.

58. The non-transitory computer readable media of claim 41, wherein outputs of the machine learning system for the received image and the additional images are combined to identify the at least one font.

59. The non-transitory computer readable media of claim 41, wherein the machine learning system comprises a generative adversarial network (GAN).

60. The non-transitory computer readable media of claim 59, wherein the generative adversarial network (GAN) comprises a generator neural network and a discriminator neural network.

* * * * *